US006945868B2

(12) United States Patent  (10) Patent No.: US 6,945,868 B2
Gautney                    (45) Date of Patent:    Sep. 20, 2005

(54) OUTDOOR FAN SYSTEM

(76) Inventor: James Cameron Gautney, 105 Bluff Rd., Tuscumbia, AL (US) 35674

(*) Notice: Subject to any disclaimer, the term of this patent is extended or adjusted under 35 U.S.C. 154(b) by 0 days.

(21) Appl. No.: 10/732,878

(22) Filed: Dec. 10, 2003

(65) Prior Publication Data

US 2004/0121720 A1 Jun. 24, 2004

Related U.S. Application Data

(63) Continuation-in-part of application No. 09/978,646, filed on Oct. 16, 2001, now Pat. No. 6,669,556.

(51) Int. Cl.$^7$ ............................................. F24F 7/007
(52) U.S. Cl. .................. 454/338; D23/386; 55/467; 55/471; 55/473; 312/100; 454/256; 454/337; 454/370
(58) Field of Search ................ 454/337, 338, 454/370, 306, 230, 233, 902; D23/342, 351, 356, 383, 386, 499; 62/78, 261, 260, 265; 392/365, 368; 55/467, 467.1, 471, 473; 312/100

(56) References Cited

U.S. PATENT DOCUMENTS

| 1,391,592 A | | 9/1921 | Stone .......................... 261/102 |
| 1,900,956 A | * | 3/1933 | Somersall ..................... 392/367 |
| 2,215,753 A | | 9/1940 | Goodman et al. ........ 239/214.3 |
| 2,871,057 A | | 11/1959 | Bernyk .......................... 299/78 |
| 3,305,665 A | * | 2/1967 | Laing ........................... 392/368 |
| 3,444,799 A | | 5/1969 | Covington ..................... 135/16 |
| 3,742,189 A | | 6/1973 | Conroy et al. ............... 126/521 |
| 3,802,168 A | * | 4/1974 | Deckas ........................... 55/473 |
| RE28,640 E | * | 12/1975 | Sauriol ............................. 52/19 |
| D245,511 S | | 8/1977 | Lewis ........................ D23/155 |
| D282,396 S | | 1/1986 | Weaver ...................... D23/162 |
| 4,753,496 A | | 6/1988 | Bussard ....................... 312/236 |
| 4,775,001 A | | 10/1988 | Ward et al. .................. 165/108 |
| 4,899,027 A | | 2/1990 | Wong ............................ 219/10 |
| 4,900,346 A | * | 2/1990 | Lutz ............................. 96/142 |
| 5,011,034 A | | 4/1991 | Abel ............................. 220/23 |
| 5,160,517 A | | 11/1992 | Hicks et al. ................... 55/385 |
| 5,180,332 A | * | 1/1993 | Mitchell et al. ............. 454/230 |
| 5,230,720 A | | 7/1993 | Kendall ......................... 55/210 |
| 5,285,961 A | | 2/1994 | Rodriguez, Jr. ............... 236/47 |
| 5,358,443 A | * | 10/1994 | Mitchell et al. ............. 454/230 |
| D361,414 S | | 8/1995 | Trautloff et al. ............. D32/15 |
| 5,568,824 A | | 10/1996 | Cordrey ....................... 137/355 |
| 5,810,660 A | * | 9/1998 | Lee .............................. 454/233 |
| 5,904,755 A | | 5/1999 | Kanazashi et al. ............. 96/55 |
| D410,824 S | | 6/1999 | Kownacki et al. ............... D8/1 |
| 5,988,207 A | | 11/1999 | Kownacki et al. ........... 137/355 |
| 5,997,619 A | * | 12/1999 | Knuth et al. ................... 96/224 |
| D435,405 S | | 12/2000 | Clark, Jr. ......................... D8/1 |
| 2001/0053666 A1 | | 12/2001 | Shih-Ting .................... 454/233 |

FOREIGN PATENT DOCUMENTS

| JP | 1-305239 | * 12/1989 |
| JP | 61-268927 | * 11/2004 |

OTHER PUBLICATIONS

U.S. Appl. No. 09/978,646, filed Oct. 16, 2001, by James C. Gautney.

* cited by examiner

*Primary Examiner*—Harold Joyce
(74) *Attorney, Agent, or Firm*—Waddey and Patterson, P.C.; Larry W. Brantley; Howard H. Bayless

(57) ABSTRACT

A camouflaged outdoor fan system includes a housing, a fan inserted into the housing, and a camouflaged lid removably connected to the housing. The housing is buried in the ground, or in alternative embodiment, mounted to the underside of a deck, the fan is inserted into the housing, and the camouflaged lid is placed over the fan to hide the fan and housing from view. The fan is operable to generate and propel an air stream out of the housing that can be used for cooling purposes. The system also may include optional features, such as a water-misting device, a heater, motion detectors, an evaporative cooling assembly, a temperature switch, a humidity switch, a rain gauge switch, a wind sensor switch, a dc power source, solar cells, or a remote control system.

14 Claims, 25 Drawing Sheets

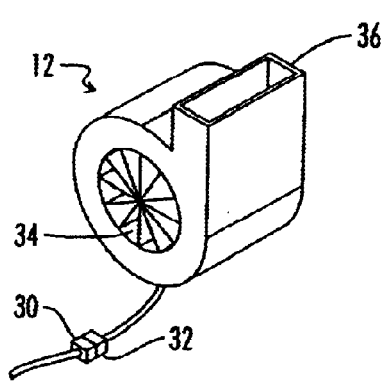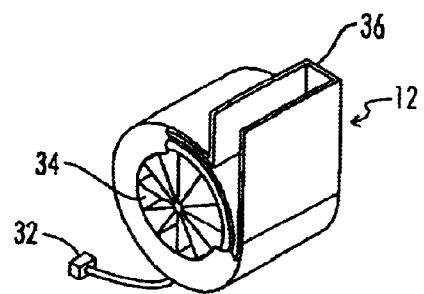
FIG. 8
FIG. 9
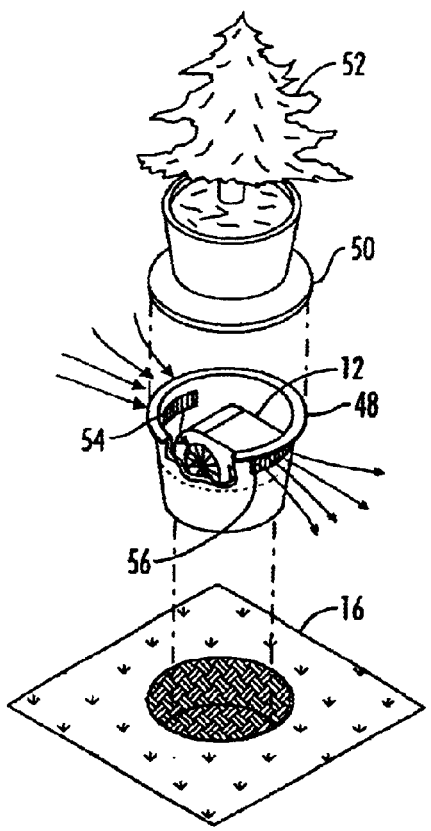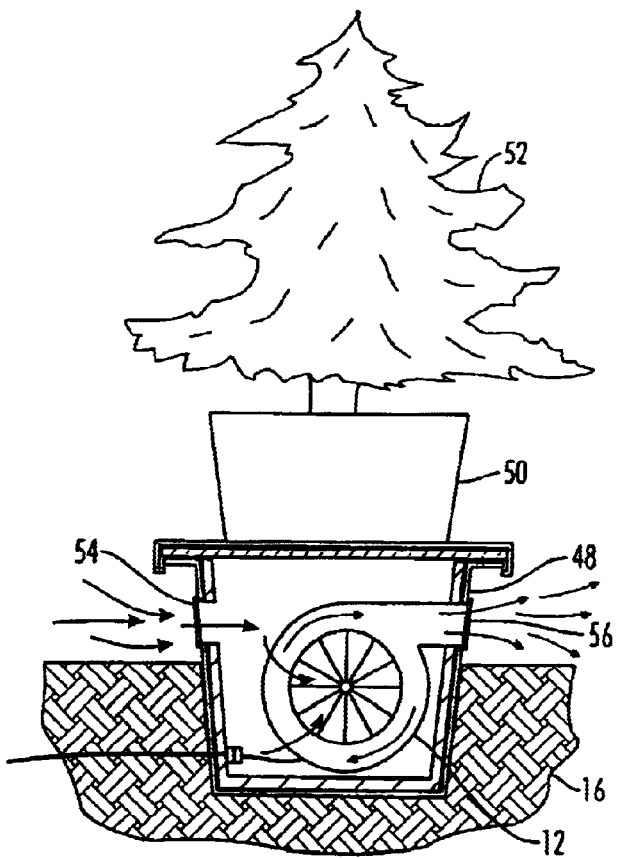
FIG. 10
FIG. 11

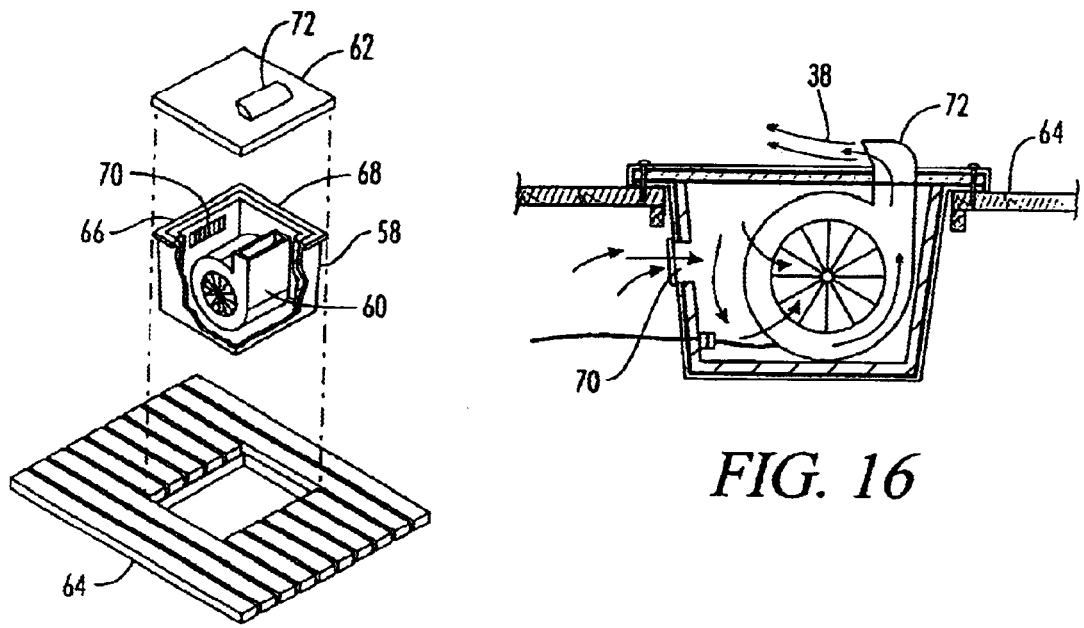
FIG. 15
FIG. 16
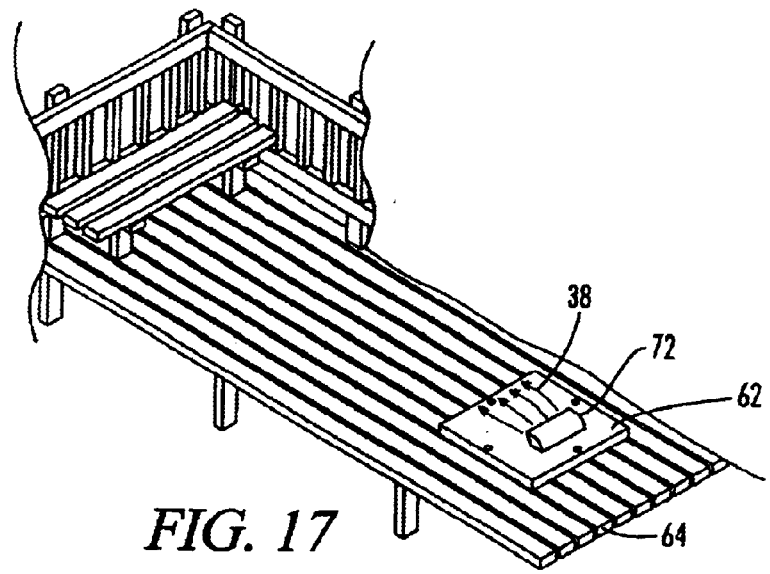
FIG. 17

OUTDOOR FAN SYSTEM

This application is a Continuation-in-part patent application claiming priority under 35 U.S.C. 120 on U.S. patent application Ser. No. 09/978,646 filed Oct. 16, 2001 now U.S. Pat. No. 6,669,556 and entitled "Outdoor Fan System," which is hereby incorporated by reference.

Be it known that I, James Cameron Gautney, a citizen of the United States, residing at 105 Bluff Road, Tuscumbia Ala. 35674, have invented a new and useful "Outdoor Fan System."

BACKGROUND OF THE INVENTION

The present invention relates generally to fan systems. More particularly, this invention pertains to a camouflaged outdoor fan system.

Camouflaged fan systems used to generate air streams are known in the art. For example, U.S. Pat. No. D245,511, issued to Lewis on Aug. 23, 1977 and entitled "Combined Furniture Commode and Room Fan," discloses a fan system that includes a fan mounted in a lower portion of a commode. U.S. Pat. No. 4,753,496, issued to Bussard on Jun. 28, 1988 and entitled "Cabinet With Built-In Fan," discloses a fan system that includes a fan installed inside a cabinet. U.S. Pat. No. 4,899,027, issued to Wong on Feb. 6, 1990 and entitled "Double-Effect Table With Heating And Cooling Purposes," teaches the use of a fan installed in a foot stand support for a table.

None of the above-referenced patents, however, suggest or teach a camouflaged fan system suitable for generating air streams outdoors. In addition, ceiling fan systems, which are also known in the art and are used to provide air streams outdoors during hot summer days, are not always suitable for outdoor cooling.

First, ceiling fan systems are typically mounted above an area to be cooled on a house, building, or some other type of support structure. In some cases, however, the use of a ceiling fan is not possible because the area to be cooled is not located close to a support structure. More importantly, in other cases, the appearance of a ceiling fan is simply undesirable.

What is needed, then, is an outdoor fan system for generating air streams that does not require a support structure, such as a house or building, and that does not have the appearance of a conventional ceiling fan system.

SUMMARY OF THE INVENTION

The present invention satisfies the above-referenced need using a camouflaged outdoor fan system that includes a housing, a fan (or air blower) inside the housing, and a camouflaged lid removably connected to the housing. The housing is adapted to be buried in the ground, either partially or completely, and is water, mildew, and ultraviolet light resistant. The housing is also soundproof in order to reduce noise generated by the fan. The fan is operable to generate an air stream by drawing air in through a lid air inlet port defined in the camouflaged lid and blowing air out through a lid air outlet port defined in the camouflaged lid.

In one embodiment, the camouflaged outdoor fan system of the present invention includes a housing, a fan, and a simulated rock lid. In a second embodiment, the system of the present invention includes a housing, a fan, and a planter lid, i.e., a lid that includes one or more plants. In a third embodiment, the system includes a housing, a fan, and a promotional sign lid. In a fourth embodiment, the present invention includes a housing, a fan, and a deck mount lid adapted to be mounted beneath a deck. In a fifth embodiment, the system of the present invention includes a housing, a fan, and a fence mount lid adapted to be connected to the backside of a fence. In a sixth embodiment, the system of the present invention includes an upper housing, a lower housing, a filter assembly connected between the upper and lower housings, and a fan assembly inside the lower housing.

All of the above-referenced embodiments may also include optional equipment, such as a water-misting device, an evaporative cooling assembly, a heater, an oscillating air stream directional guide, a variable speed fan, a remote control system, temperature switches, humidity switches, rain gauge switches, solar cells, a DC power source, or some combination thereof.

The present invention can be used in a variety of locations. For example, the present invention can be used in residential gardens and backyards, sports arenas, amusement parks, greenhouses, municipal parks, national parks, state parks, zoos, national monuments, outdoor restaurants, fishing piers, boat docks, campsites, or recreational vehicles (RVs). In addition, the present invention can be used around pools, decks, patios, walkways, movie theater waiting lines, outdoor automatic teller machines (ATMs), car washes, schools, daycares, kennels, barns and downtown shopping areas along sidewalks. In short, the present invention may be used anywhere there is a need for outdoor cooling.

BRIEF DESCRIPTION OF THE DRAWINGS

FIGS. 8 and 9 are perspective views of a fan used with the first embodiment of the present invention.

FIG. 10 is an exploded perspective view of a second embodiment of the present invention.

FIG. 11 is a cross-sectional view of the second embodiment of the present invention.

FIG. 15 is an exploded perspective view of a fourth embodiment of the present invention.

FIG. 16 is a cross-sectional view of the fourth embodiment of the present invention.

FIG. 17 is a perspective view of the fourth embodiment of the present invention connected to the underside of a deck and positioned to blow an air stream on the deck.

DESCRIPTION OF THE PREFERRED EMBODIMENTS

Figure 1:
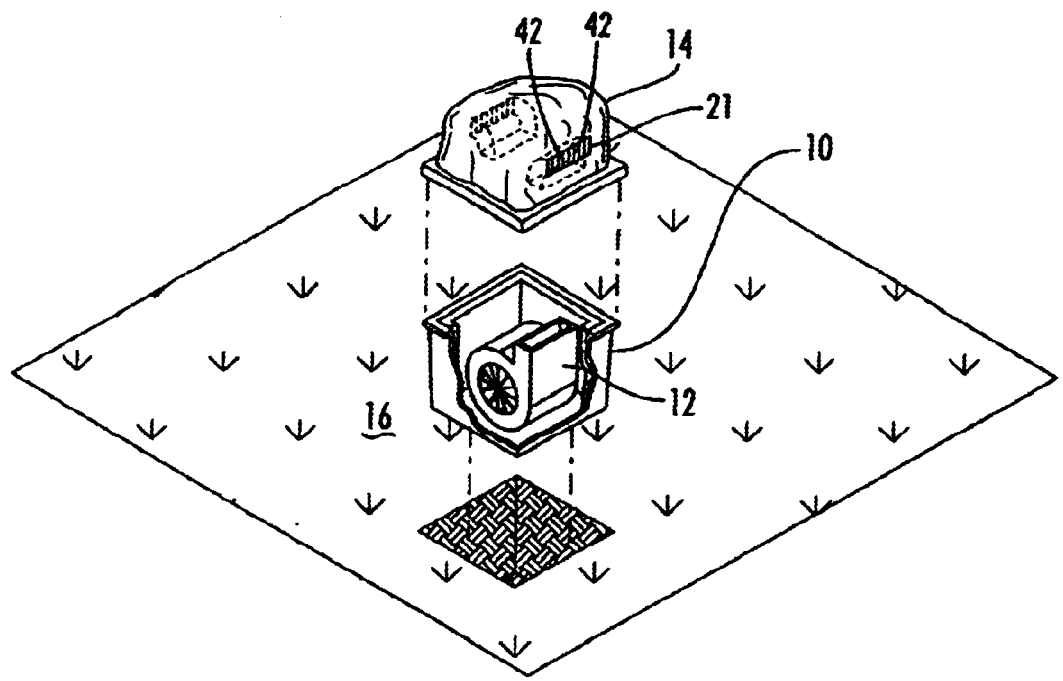
FIG. 1 is an exploded perspective view of a first embodiment of the present invention.
Figure 2:
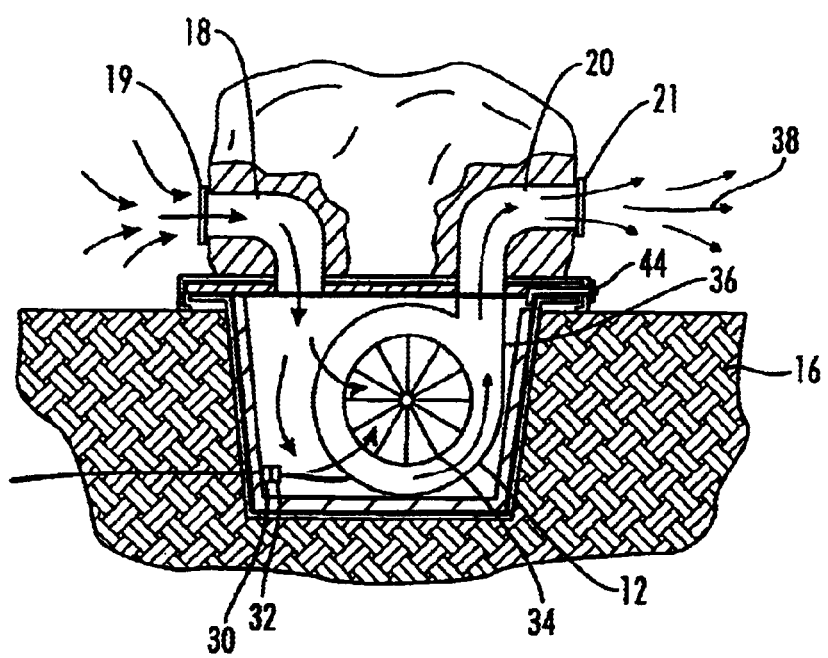
FIG. 2 is a cross-sectional view of the first embodiment of the present invention.
Figure 3:
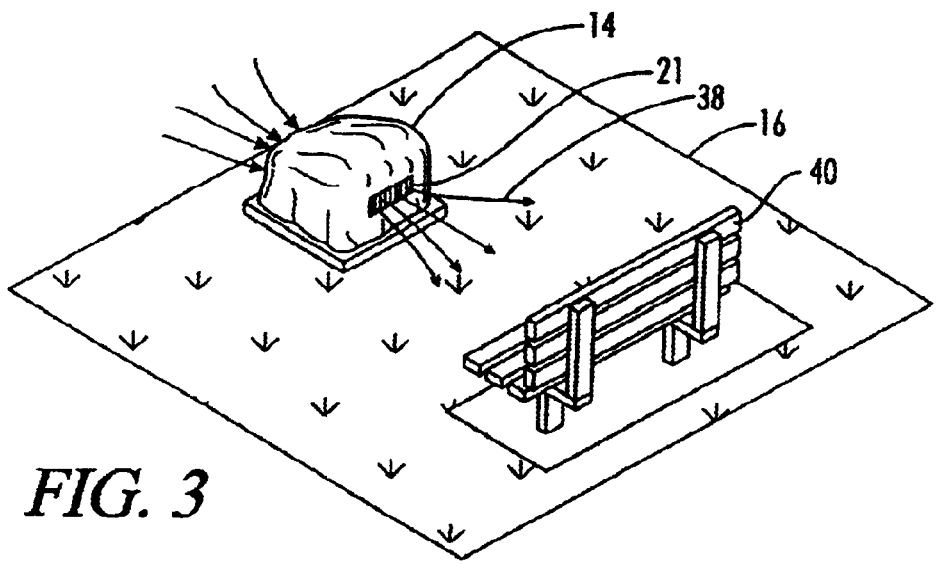
FIG. 3 is a perspective view of the first embodiment of the present invention positioned to blow an air stream on a park bench.

Referring to FIGS. 1–3, a first embodiment of the present invention includes a housing 10, a variable speed fan 12 positioned inside the housing 10, and a rock-shaped lid 14 removably connected to the housing 10. The housing 10 is buried in the ground 16 and provides support for the fan 12. The housing 10 is soundproof, in order to reduce the noise generated by the fan 12, and water resistant, to reduce the amount of water entering the housing 10 from the ground 16. In addition, the housing 10 is ultraviolet (UV) resistant and mildew resistant as well.

The rock-shaped lid 14 includes a lid air inlet port 18, which allows air to be drawn into the housing 10 by the fan 12, and a lid air outlet port 20, which allows air to be blown out of the housing 10 by the fan 12. In addition, the lid 14 includes a bug screen 19 connected over the lid air inlet port 18 and a diffuser grill 21 connected over the lid air outlet port 20. The bug screen 19 prevents bugs from being drawn into the housing 10 and the diffuser grill 21.

Figure 4:
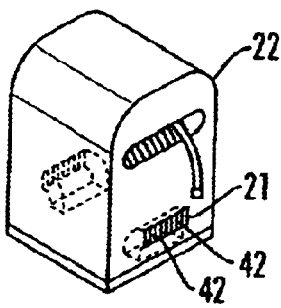
FIG. 4 is a perspective view of a garden hose reel lid used with the present invention.
Figure 5:
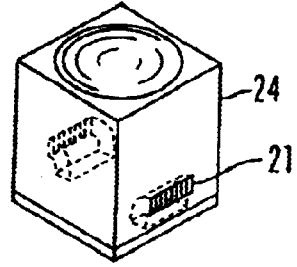
FIG. 5 is a perspective view of a birdbath lid used with the present invention.
Figure 6:
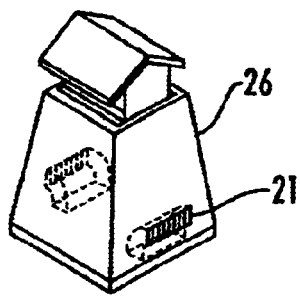
FIG. 6 is a perspective view of a bird feeder lid used with the present invention.
Figure 7:
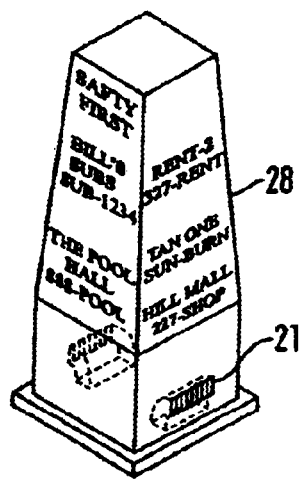
FIG. 7 is a perspective view of a promotional sign lid used with the present invention.

Although the lid 14 shown in FIG. 1 is rock-shaped, alternative embodiments may use other shapes as well. For example, the lid 14 may be a garden hose reel lid 22 (see FIG. 4), a birdbath lid 24 (see FIG. 5), a bird feeder lid 26 (see FIG. 6), or a promotional sign lid 28 (see FIG. 7). Furthermore, all of the lids have a common housing interface and are interchangeable. Thus, the rock lid 14 may be replaced with the birdbath lid 24 or the promotional sign lid 28.

Referring back to FIG. 2, the fan 12 is connected to an AC power source (not shown) using quick electrical connect/disconnect fittings, 30 and 32. The fan 12 includes a fan air inlet opening 34 and a fan air outlet opening 36 (see also FIGS. 8 and 9), which is positioned adjacent to the lid air outlet opening 20. The fan 12 is operable to generate and propel an air stream 38 out of the fan air outlet opening 36 and through the lid air outlet opening 20. A variety of conventional fans, such as tube axial fans, cross flow blowers, motorized impellors, and axial fans, are known in the art and may be used with the present invention.

Referring to FIG. 3, the first embodiment of the present invention is shown in use directing the air stream 38 toward a park bench 40. The housing 10 is buried in the ground 16, the fan 12 is inserted into the housing 10 and connected to an AC power source (not shown) using the quick electrical connect/disconnect fittings, 30 and 32, (not shown in FIG. 3, but see FIG. 2) and then both the housing 10 and fan 12 are covered by the rock lid 14. Because the fan 12 is connected using the quick connect/disconnect fittings, the fan 12 can easily be inserted into or removed from the housing 10.

The rock lid 14 includes a set of air diverter veins (or air guide) 42 for controlling the direction of the air stream 38. The air diverter veins 42 may be adjusted to direct a narrow air stream 38 or a wide air stream 38, depending upon the location of the invention and the area to be cooled. For example, the air diverter veins 42 may be adjusted to provide a narrow air stream 38 approximately 20 degrees wide or a wide air stream 38 approximately 180 degrees wide. In addition, the air diverter veins 42 may be automated to oscillate back and forth across a certain area. In this case, the present invention includes a motor (not shown) connected to the air diverter veins 42 for moving the veins 42 back and forth. Finally, the rock lid 14 also includes a conventional locking mechanism 44 for securing the lid 14 to the housing 10.

Figure 12:
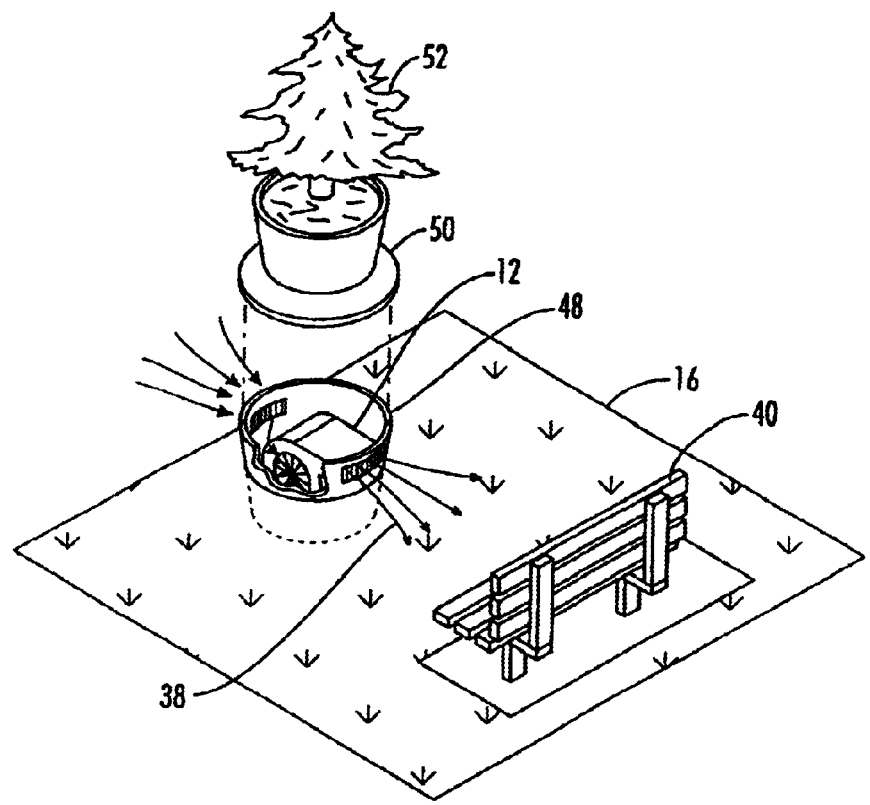
FIG. 12 is a perspective view of the second embodiment of the present invention positioned to blow an air stream on a park bench.

Referring to FIGS. 10–12, a second embodiment of the present invention includes a housing 48 partially buried in the ground 16, the fan 12 inside the housing 48, a planter lid 50 removably connected to the housing 48, and a plant 52 in the planter lid 50. The second embodiment of the present invention is identical to the first embodiment with the exception of a couple of features.

First, the second embodiment does not include lid air inlet and outlet ports, 20 and 22. Instead, the second embodiment includes a housing air inlet port 54 and a housing air outlet port 56, both of which perform the same functions provided by lid air inlet and outlet ports, 20 and 22.

Second, the rock lid 14 of the first embodiment is replaced with the planter lid 50, which includes a recess (not shown) for receiving the potted plant 52. The purpose of the planter lid 50 is identical to the purpose of the rock lid 14—to conceal the fan 12. Although the planter lid 50 shown in FIGS. 10–12 includes a single recess (not shown) and a single plant, alternative embodiments may include a variety of recesses in a variety of arrangements for holding multiple plants.

Figure 13:
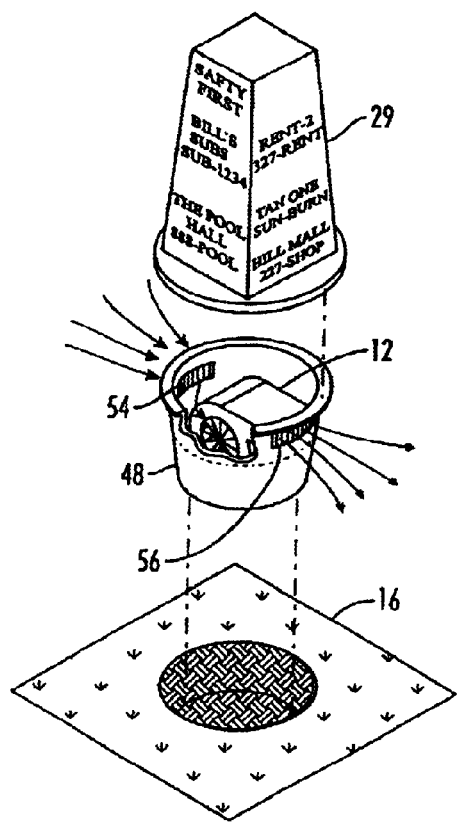
FIG. 13 is an exploded perspective view of a third embodiment of the present invention.
Figure 14:
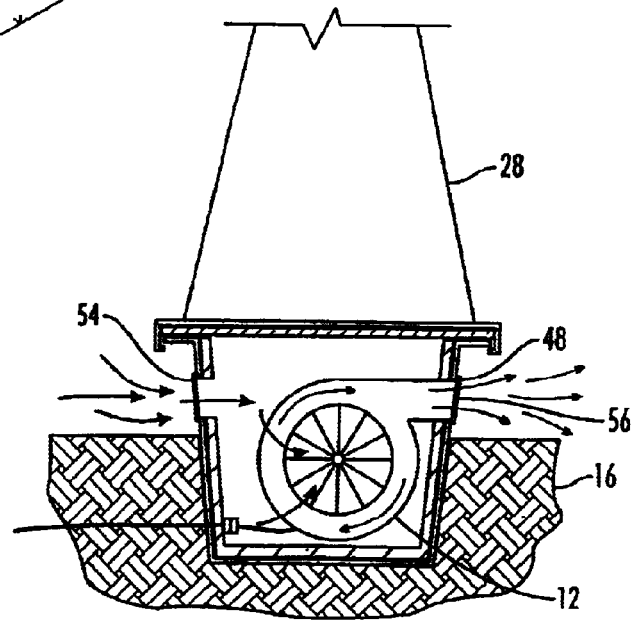
FIG. 14 is a cross-sectional view of the third embodiment of the present invention.
Figure 18:
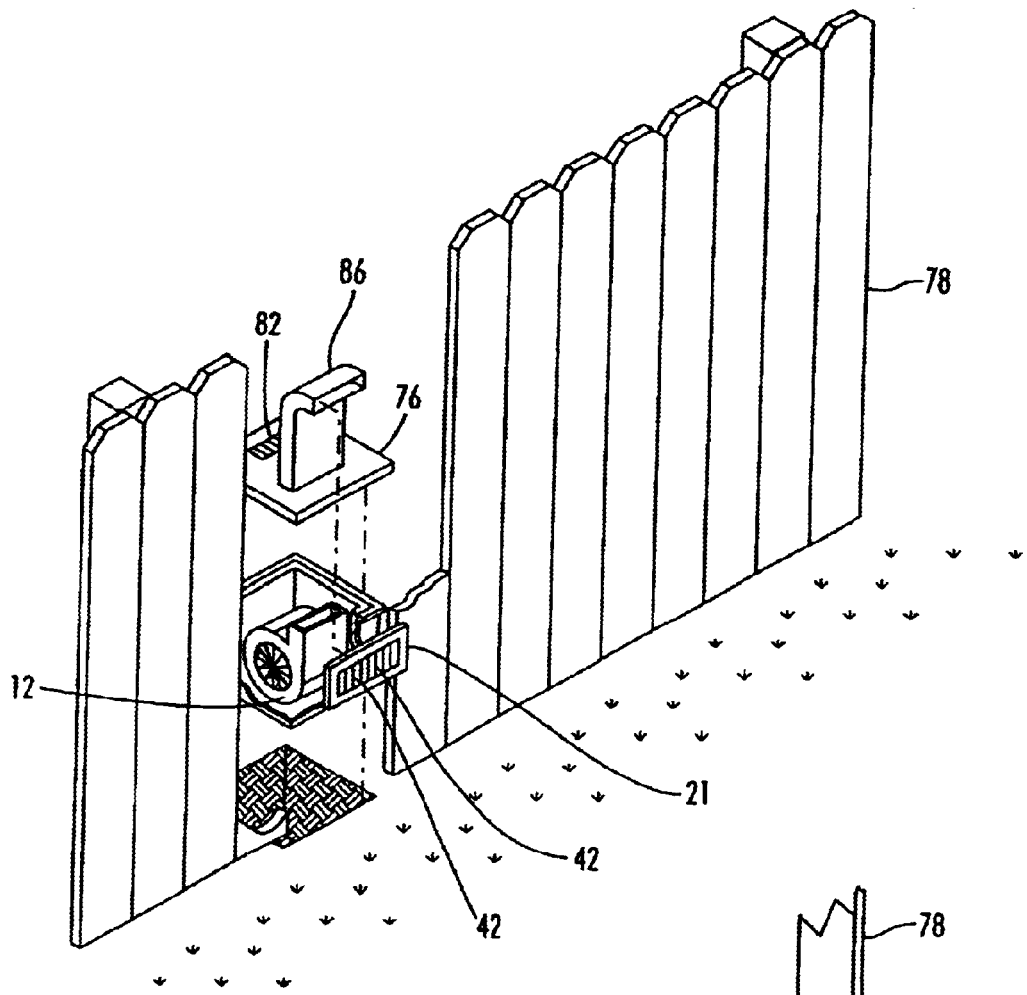
FIG. 18 is an exploded perspective view of a fifth embodiment of the present invention.

In a third embodiment (see FIGS. 13 and 14), the planter lid 50 of the present invention is replaced by the promotion sign lid 29. The promotional sign lid 29 is rectangular-shaped and includes promotional advertisements for businesses, such as restaurants, tanning salons, and malls. The third embodiment of the present invention is identical to the second embodiment with the exception of the planter lid 50 being replaced by the promotional sign lid 29.

Referring to FIGS. 15–18, a fourth embodiment of the present invention includes a housing 58, the fan 12, and a deck mount lid 62, which is adapted to be mounted beneath a deck 64. As was the case with the second and third embodiments, the fourth embodiment is identical to the first embodiment with a couple of exceptions. First, the housing 58 includes flanges, 66 and 68, for supporting the housing 58 when it is dropped down into the deck 64, and a deck housing air inlet port 70, which performs the same function as that performed by lid air inlet port 18.

In addition, the rock lid 14 is replaced with deck mount lid 62, which includes a deck air outlet port 72. The deck air outlet port 72 includes a curved portion for directing the air stream 38 over the deck 64.

Figure 19:
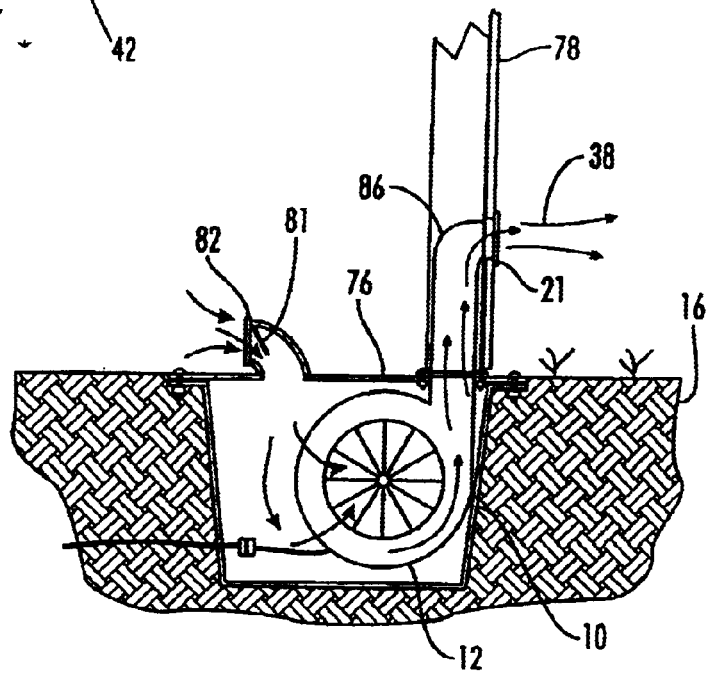
FIG. 19 is a cross-sectional view of the fifth embodiment of the present invention connected to the backside of a wooden fence.
Figure 20:
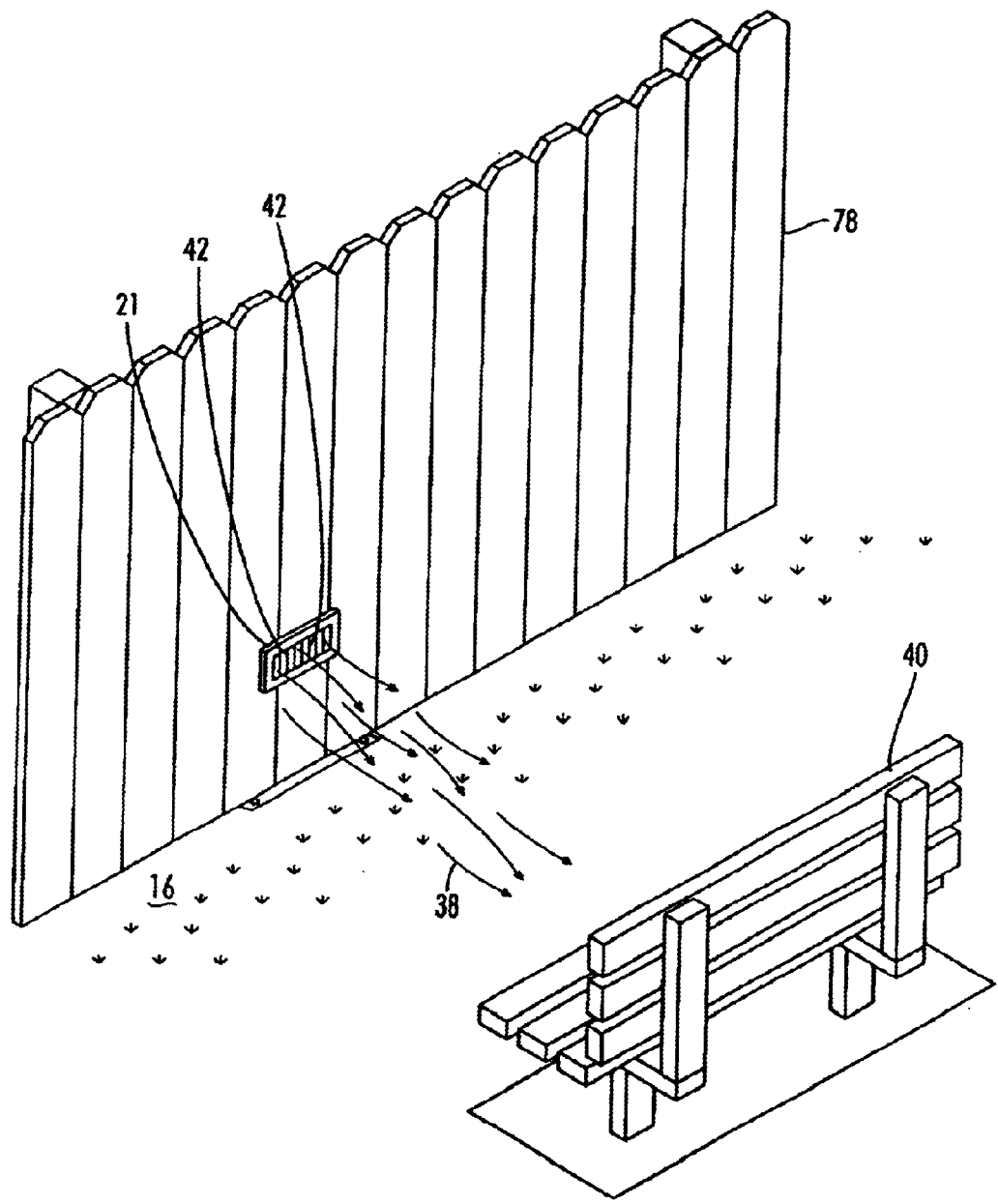
FIG. 20 is a perspective view of the fifth embodiment of the present invention connected to the backside of a wooden fence and positioned to blow an air stream in an area beside the wooden fence.
Figure 21:
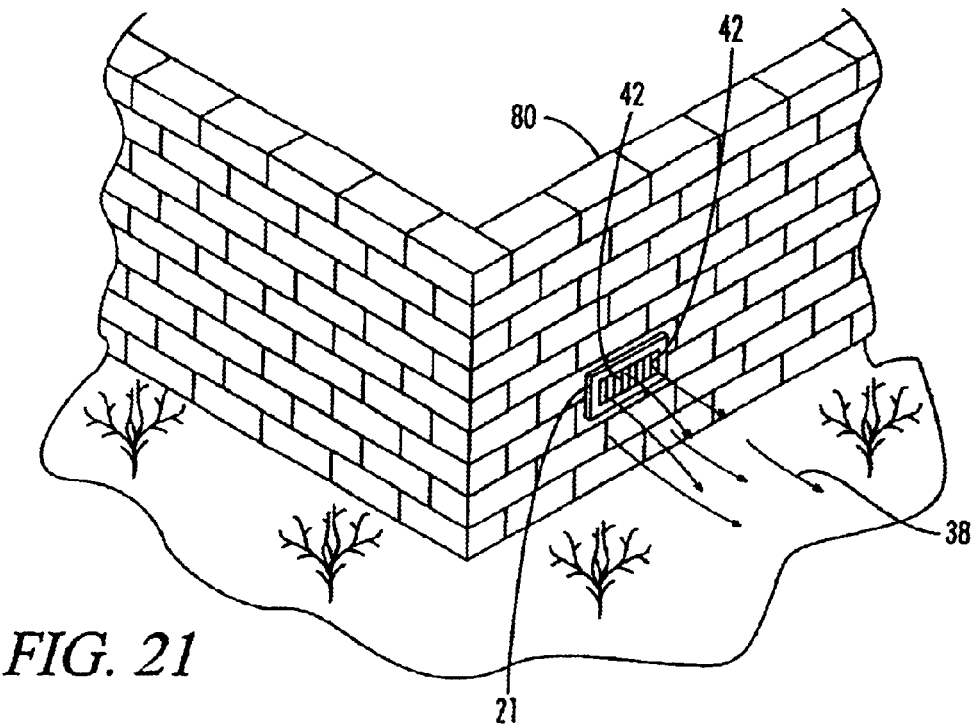
FIG. 21 is a perspective view of the fifth embodiment of the present invention connected to the backside of a brick fence and positioned to blow an air stream in an area beside the brick fence.
Figure 22:
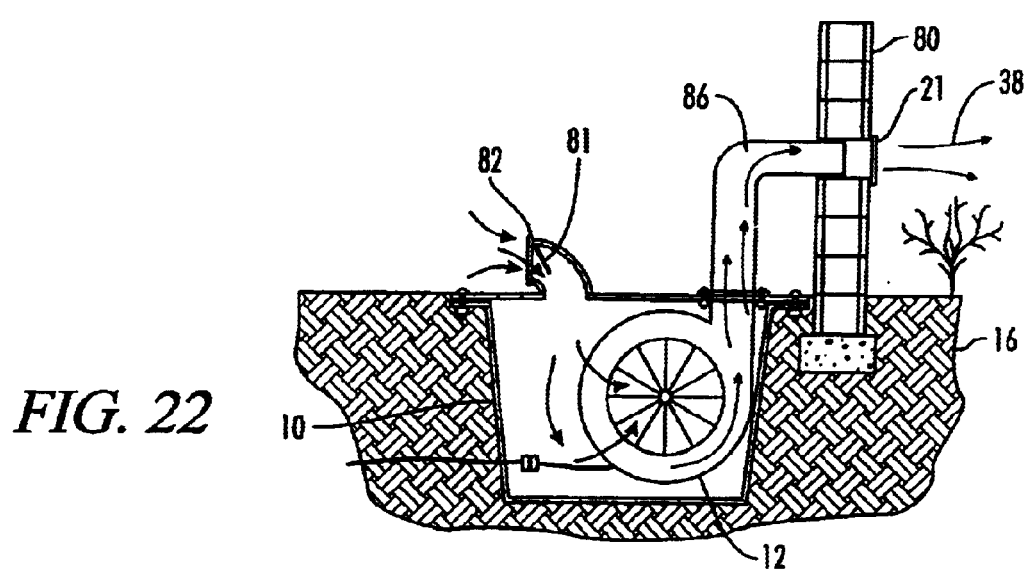
FIG. 22 is a cross-sectional view of the fifth embodiment of the present invention connected to the backside of a brick fence.

Finally, referring to FIGS. 18–22, a fifth embodiment of the present invention includes the housing 10, the fan 12, and a fence mount lid 76, which is adapted to be connected to the backside of a wooden fence 78 or a brick fence 80. The fifth embodiment is identical to the first embodiment with the exception that the rock lid 14 is replaced with the fence mount lid 76. The fence mount lid 76 includes a fence air inlet port 82, a damper 81, and a fence air outlet port 86. The fence air inlet port 82 and the fence air outlet port 86 perform the same functions as the lid air inlet port 18 and the lid air outlet port 20, respectively, in the first embodiment. The damper 81 swings open (as shown in FIGS. 19 and 22) when the system is in use to allow air to be drawn into the housing 10 by the fan 12 and swings closed when the system is not in use to prevent water from entering the housing 10.

Figure 23:
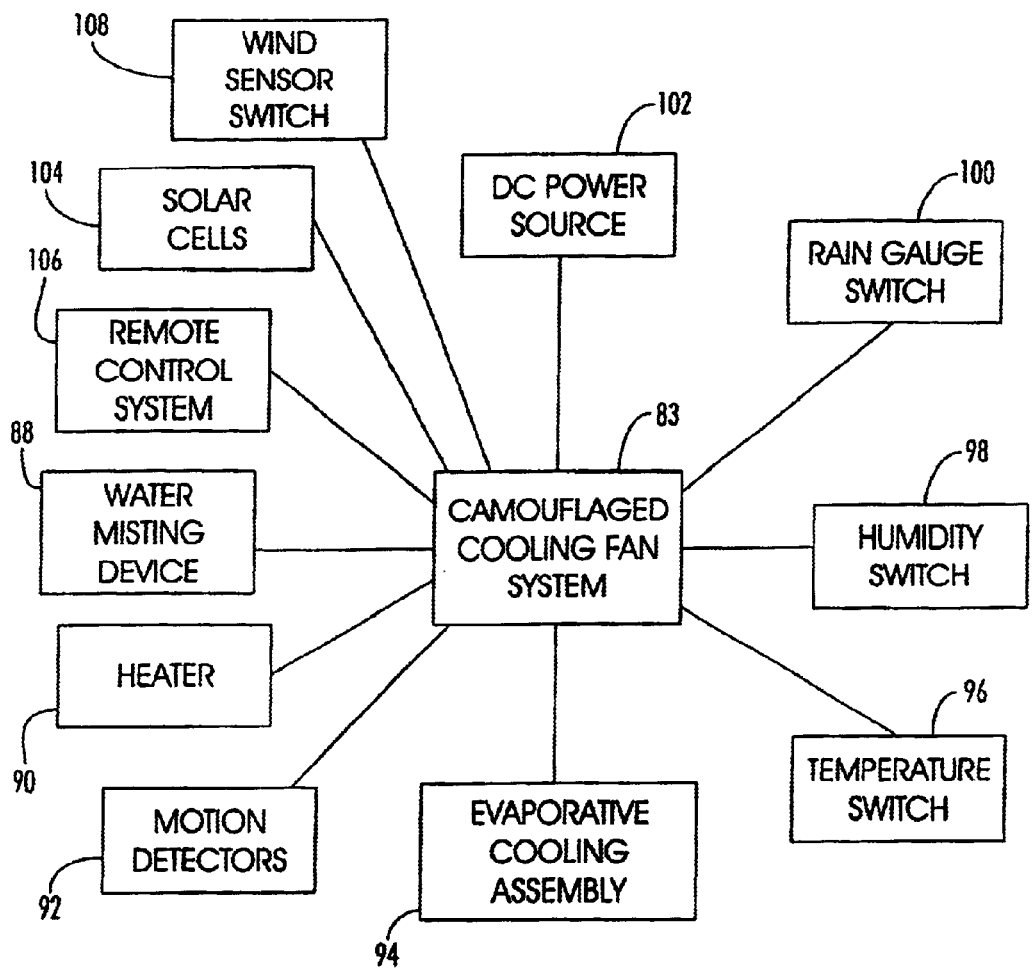
FIG. 23 is a block diagram of optional features that may be used with the present invention.
Figure 24:
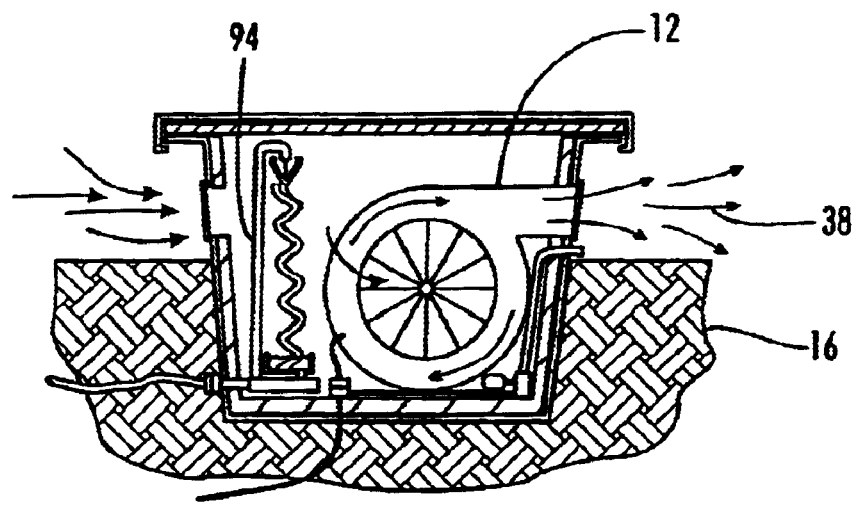
FIGS. 24 is a cross-sectional view of one embodiment of the present invention that includes an evaporative cooling assembly.
Figure 25:
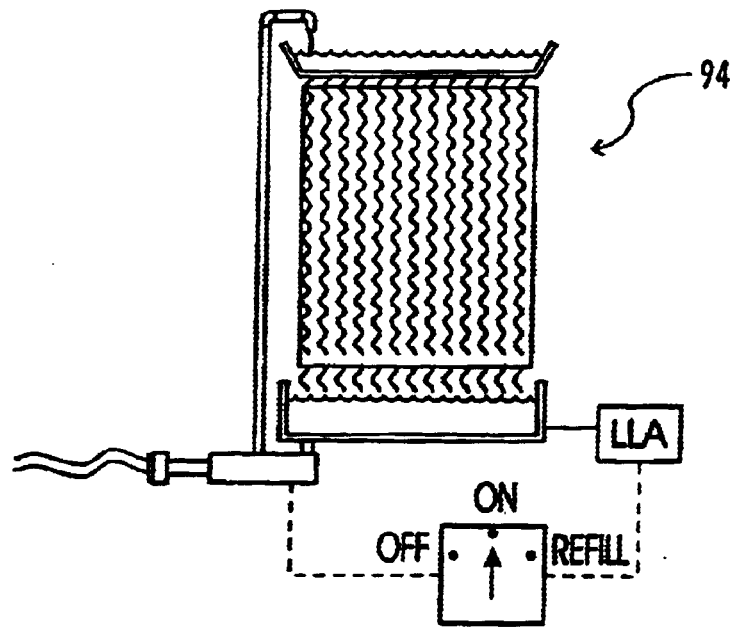
FIGS. 25 is a front view of the evaporative cooling assembly shown in FIG. 24.

Referring to FIG. 23, the camouflaged fan system 83 of the present invention may include one or more of the following optional features: 1) a water-misting device 88, 2) a heater 90, 3) motion detectors 92, 4) an evaporative cooling assembly 94, i.e., a "swamp cooler" assembly, 5) a temperature switch 96, 6) a humidity switch 98, 7) a rain gauge switch 100, 8) a dc power source 102, i.e., a battery, 9) solar cells 104, 10) a remote control system 106, or 11) a wind sensor switch 108. The water-misting device 88 may be inserted into the housing of a particular embodiment to inject a mist (not shown) into the air stream 38 to enhance the cooling effect of the air stream 38. In a similar manner, the evaporative cooling device 88 may be inserted into the housing of a particular embodiment to cool air as it is drawn into the housing (see FIGS. 24 and 25).

The heater 90 may be inserted into the housing of a particular embodiment to heat air drawn into the housing and used when outside temperatures drop below a certain level. The motion detectors 92 may be connected to the lid or housing of a particular embodiment and used to control the invention based on movement close to the invention. When movement is detected, the invention is turned on. When no movement is detected for a certain period of time, the invention is turned off.

The temperature switch 96, humidity switch 98, rain gauge switch 100, and wind sensor switch 108 all may be connected to the lid or housing of a particular embodiment and may be used to turn the invention on and off based on changing environmental conditions. For example, the temperature switch 96 may be used to turn the invention on when a certain temperature is exceeded, the humidity switch 98 may be used to turn the invention on when a certain humidity level is exceeded, the rain gauge switch 100 may be used to turn the invention off when it detects rain, and the wind sensor switch 108 may be used to turn the invention off when a certain wind level is exceeded.

Figure 26:
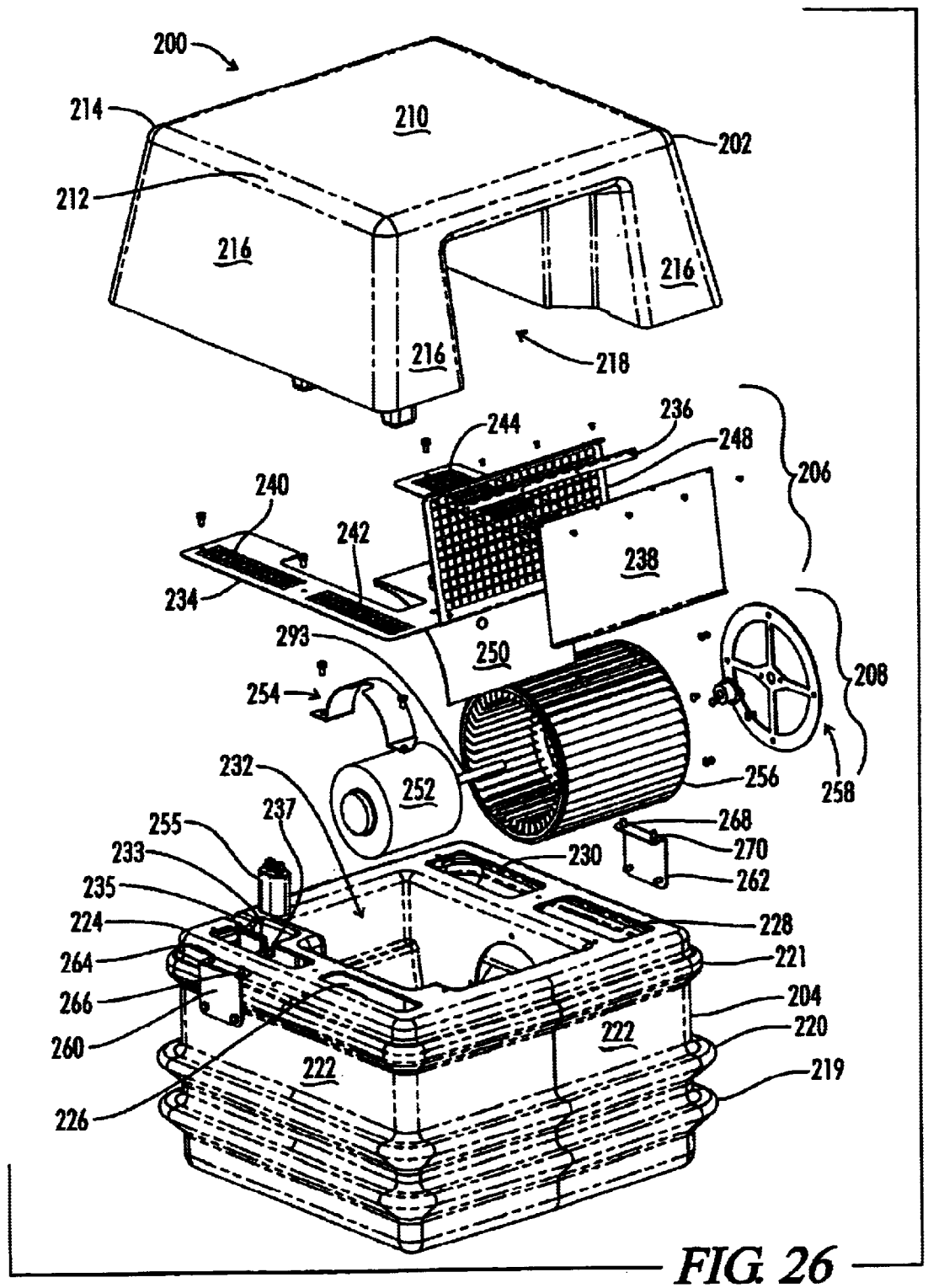
FIG. 26 is an exploded perspective view of a sixth embodiment of the present invention.

The dc power source 102 may be inserted into the housing of a particular embodiment and used for applications where an ac power source is not easily available or as a back-up power source for an ac power source. In a similar manner, solar cells 104 may be connected to the lid or housing of a particular embodiment and used to supply power to the invention. Finally, the remote control system 106 may be inserted into the housing or lid and used to remotely control all the functions of the present invention. Referring to FIG. 26, an additional embodiment 200 of the present invention includes an upper housing 202, a lower housing 204, a filter assembly 206, and a fan assembly 208. The fan assembly 206 is designed to be placed inside the lower housing 204, the filter assembly 206 is designed to be connected to the lower housing 204 after the fan assembly 208 has been inserted, and the upper housing 202 is designed to be connected to the lower housing 204 after the filter assembly 206 has been connected to the lower housing 204.

Referring to FIG. 26, an additional embodiment 200 of the present invention includes an upper housing 202, a lower housing 204, a filter assembly 206, and a fan assembly 208. The fan assembly 206 is designed to be placed inside the lower housing 204, the filter assembly 206 is designed to be connected to the lower housing 204 after the fan assembly 208 has been inserted, and the upper housing 202 is designed to be connected to the lower housing 204 after the filter assembly 206 has been connected to the lower housing 204.

The upper housing 202 is also designed so that any one of a number of camouflaging lids (not shown) may be connected to it. The camouflaged lids may have the shape of a rock, i.e., a simulated rock lid, a garden hose reel, a birdbath, a bird feeder, or a promotional sign as indicated previously with respect to other embodiments of the present inventions.

The upper housing 202 is square shaped, has a flat upper surface 210 with rounded edges 212 and rounded corners 214, and has sloped side surfaces 216 extending down from the upper surface 210. In addition, the upper housing 202 is sized so that it is slightly larger in length and width than the lower housing 204. As a result, when the upper housing 202 is mounted to the lower housing 204, the sloped side surface 216 of the upper housing 202 overhangs the lower housing 204 to form a channel for flowing air and also can be used to secure one of the camouflaged lids to the upper housing 202. The upper housing 202 is further designed so that air can be forced out of it by the fan assembly 208. To permit this function, the upper housing 202 includes an upper air channel 218.

The lower housing 204 is designed so that it may be installed in the ground, so that air can be drawn into it by the fan assembly 208, so that air can be forced out of it into the upper housing 202, and so that it can house the fan assembly 208. To facilitate installation in the ground, the lower housing 204 includes a series of ridges, 219 and 220, and an upper lip 221 extending outward from its sides 222. To allow air to be drawn inside, the lower housing 204 includes four air intake openings 224, 226, 228, and 230. To allow air to be forced into the upper housing 202, the lower housing 204 includes a lower air channel 219 (see FIG. 41). And, to allow housing of the fan assembly 208, the lower housing 204 includes a fan cavity 232, a motor starting capacitor cavity 233, and two wiring channels, 235 and 237.

The filter assembly 206 includes a filter plate 234, a filter hinge 236, and a filter flap 238. The filter plate 234 is designed to prevent debris from being pulled into the lower housing 204 through the air intake openings 224, 226, 228, and 230, and to prevent debris from passing into the upper housing 202 through the air channel 218. To prevent debris from passing into the lower housing 204, the filter plate 234 includes four lower filter sections 240, 242, 244, and 246 (obscured in FIG. 26, but see FIG. 35). To prevent debris from passing into the upper housing 202, the filter plate 234 includes an upper filter section 248. The filter plate 234 also includes a lower curved portion 250, which is designed to help channel air out of the lower housing 204.

The filter hinge and flap, 236 and 238, are designed to prevent debris, water, and other materials from entering into the upper housing 204 when the embodiment 200 shown in FIG. 26 is not in use. When the embodiment 200 is in use, the flap 238 is raised so that the air channel 218 is unobstructed and air can be blown out of the upper housing 202 by the fan assembly 208. Similarly, when the embodiment 200 is not in use, the flap 238 is lowered so that the air channel 218 is blocked by the flap 238. The flap 238 prevents debris, water, and other materials from entering into the upper housing 204.

The fan assembly 208 is designed to draw air into the lower housing 204 and to force that air out of the lower housing 204 into the upper housing 202. The fan assembly 208 includes a motor 252 having a motor shaft 253, a motor clamp 254, a motor starting capacitor 255, a cylindrical fan 256, and a motor support 258. The motor 252 is designed to be connected to an external source of AC power (not shown) and to rotate the cylindrical fan 256, which causes air to be drawn into the lower housing 204 through the air inlet openings 224, 226, 228, and 230, and to be blown out of the lower housing 204 into the upper housing 202. The motor clamp 254 is designed to secure the motor 252 inside the fan cavity 232 and the motor support 258 is designed to provide support for the motor shaft 253. The motor starting capacitor 255 is designed to provide the motor 252 with starting current.

To allow the upper and lower housings 202 and 204 to be connected together, the embodiment 200 shown in FIG. 26 also includes housing connectors, 260 and 262. Housing connector 260 is L-shaped and includes connector pins, 264 and 266. In a similar manner, housing connector 262 is also L-shaped and includes connector pins, 268 and 270. Both housing connectors, 260 and 262, are designed to be connected to the lower housing 204 so that the connector pins, 264, 266, 268, and 270, extend upward and can be used to connect the upper housing 202 to the lower housing 204.

Figure 27:
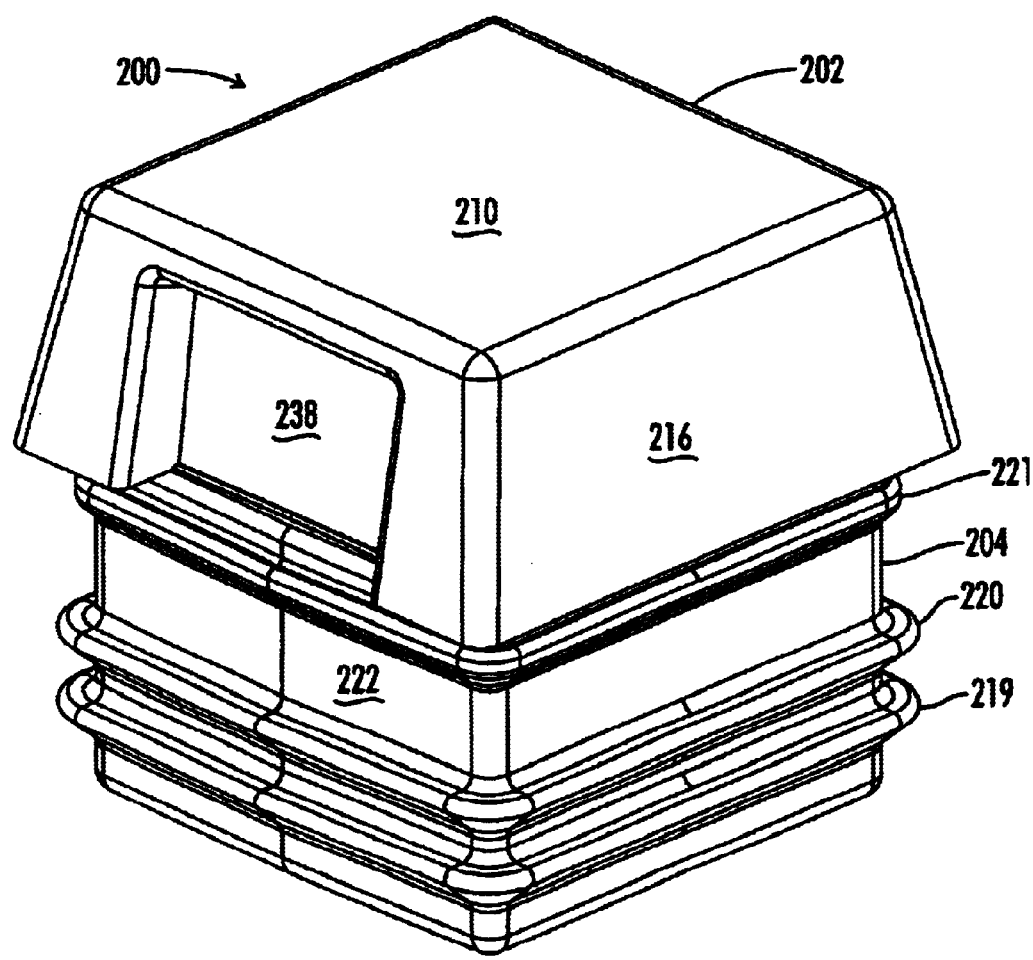
FIG. 27 is an assembled perspective view of the embodiment shown in FIG. 26.
Figure 28:
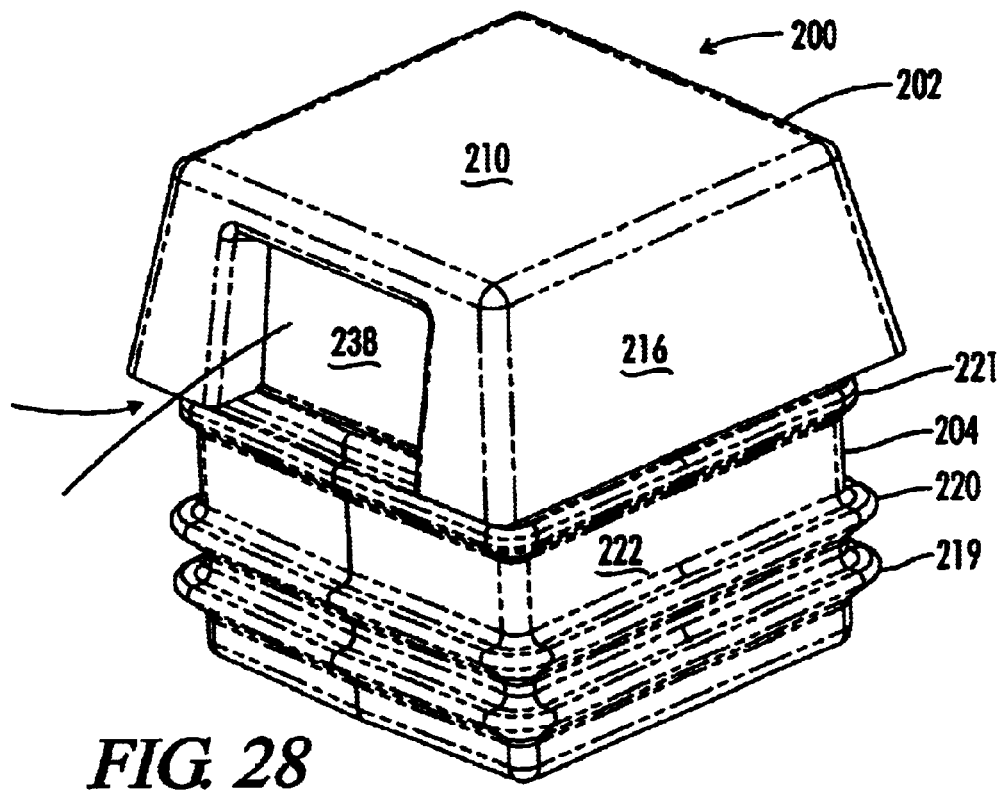
FIG. 28 is an assembled line drawing perspective view of the embodiment shown in FIG. 26.
Figure 29:
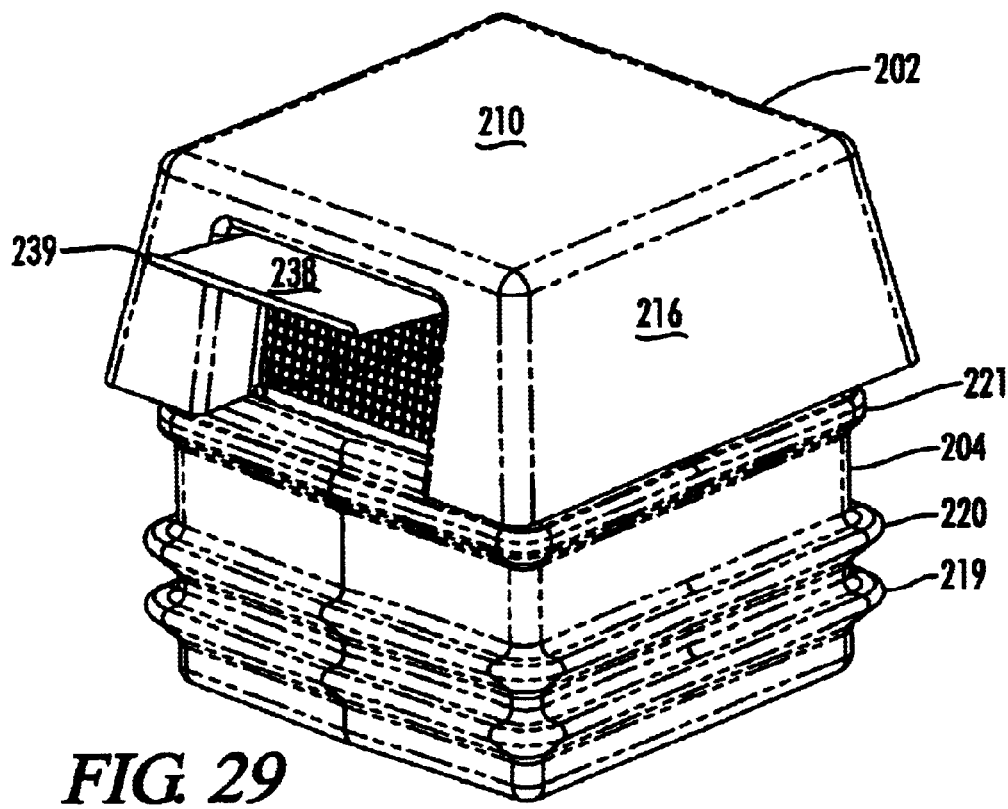
FIG. 29 is an assembled line drawing perspective view of the embodiment shown in FIG. 26 with the filter flap raised.

FIGS. 27, 28, and 29, show an assembled version of the embodiment 200. As shown in FIGS. 27 and 28, the flap 238 is down and prevents water, debris, and other materials from entering into the upper housing 202. FIG. 29 shows the flap 238 in a raised position.

Figure 30:
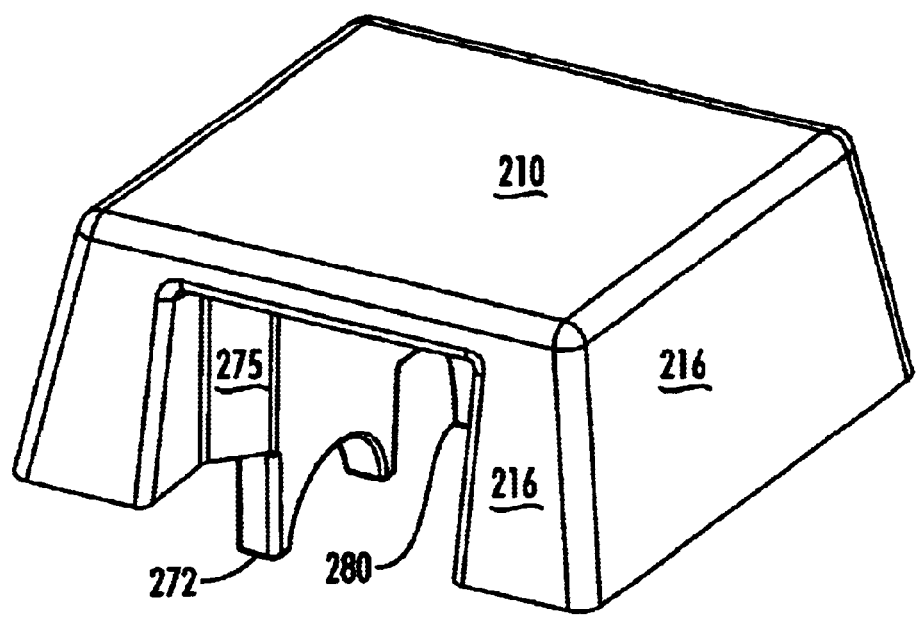
FIG. 30 is an enlarged top perspective view of the upper housing shown in FIG. 26.
Figure 31:
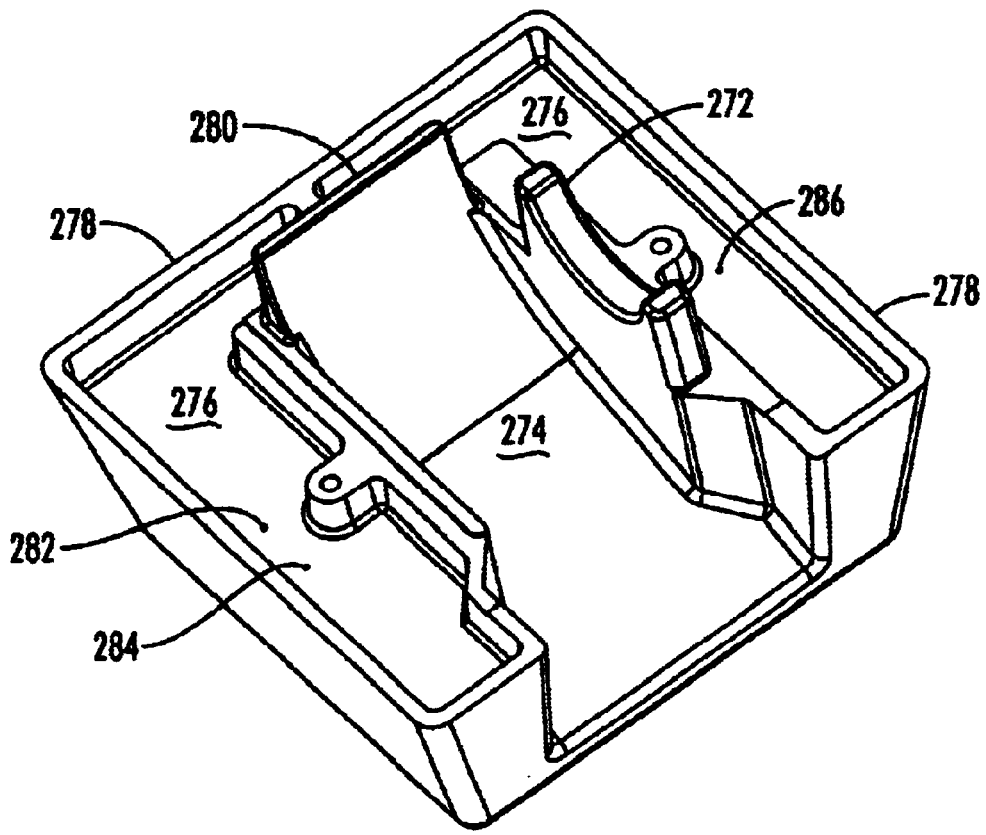
FIG. 31 is an enlarged bottom perspective view of the upper housing shown in FIG. 26.

Referring now to FIG. 30, which is a top perspective view, and FIG. 31, which is a bottom perspective view, the upper housing 202 includes an upper motor support 272, an upper housing curved portion 274, upper housing side walls, 273 (obscured in FIGS. 28 and 29) and 275, and an indented lower surface 276 forming an upper housing lip 278. The upper motor support 272 is designed to form a motor cavity air inlet 273 (see FIG. 45) around the motor 252 when the lower and upper housings, 202 and 204, are assembled. The upper motor support 272 protrudes from the lower surface 276 and is u-shaped so that it can form the motor cavity air inlet 273. The upper housing curved portion 274 is designed to form part of the air channel 218 and includes a triangular portion 280 that extends outward away from the lower surface 276.

The indented lower surface 276 includes upper housing connector openings, 282, 284, 286, and 288 (obscured by the upper motor support 272), which are designed to receive the housing connector pins, 264, 266, 268, and 270, and hold the upper housing 202 in place with respect to the lower housing 204. The lip 278 is designed to be used to mount one of the camouflaged lids (not shown) discussed previously to the upper housing 202.

Figure 32:
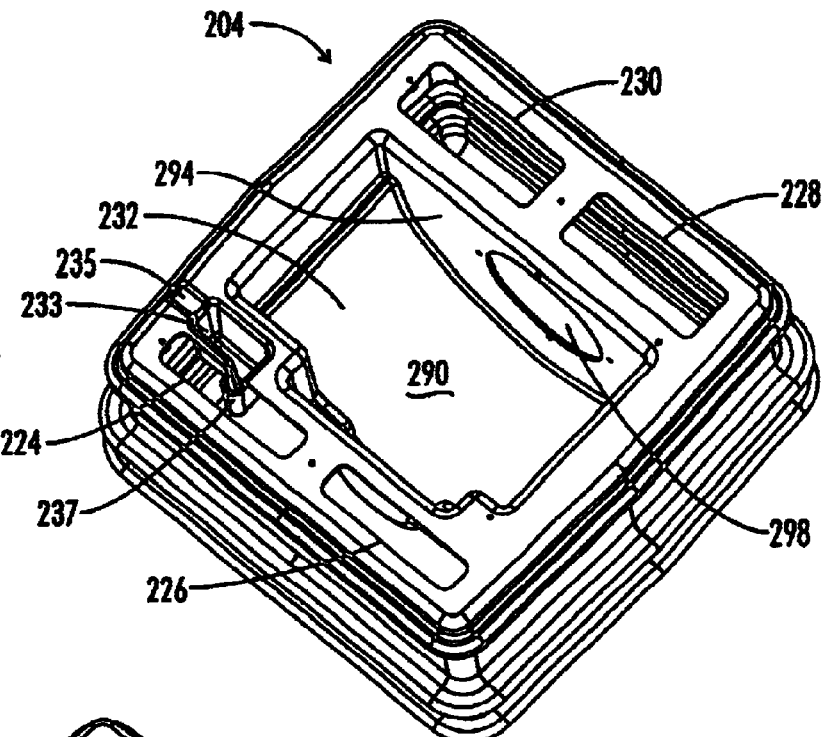
FIG. 32 is an enlarged top perspective view of the lower housing shown in FIG. 26.
Figure 33:
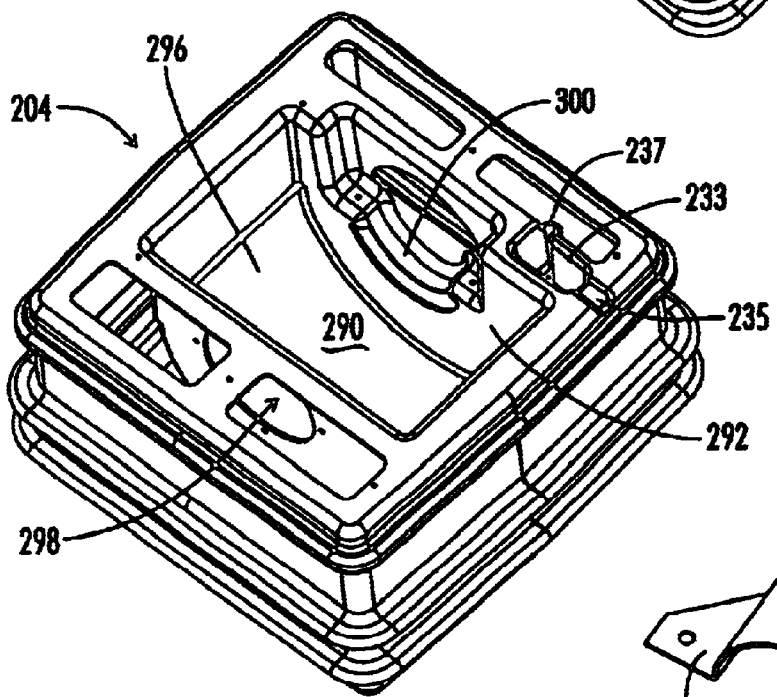
FIG. 33 is a second enlarged top perspective view of the lower housing shown in FIG. 26.

Turning now to FIGS. 32 and 33, the fan cavity 232 includes a lower housing curved portion 290, lower housing side walls, 292 and 294, a lower housing lip 296, a motor support opening 298, and a lower housing motor support 300. The lower housing curved portion 290 is designed to channel air out of the lower housing 204 into the upper housing 202 and the lower housing lip 296 is designed to provide support for the lower curved portion 250 of the filter plate 234. The motor support 258 (FIG. 26) is designed to be connected to the motor support opening 298 so that it can provide support for the motor shaft 253. The lower housing support 300 is designed to provide support for the motor 252 and the motor clamp 254.

Figure 34:
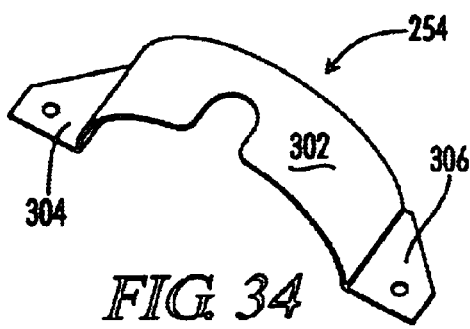
FIG. 34 is an enlarged perspective view of the motor clamp shown in FIG. 26.
Figure 35:
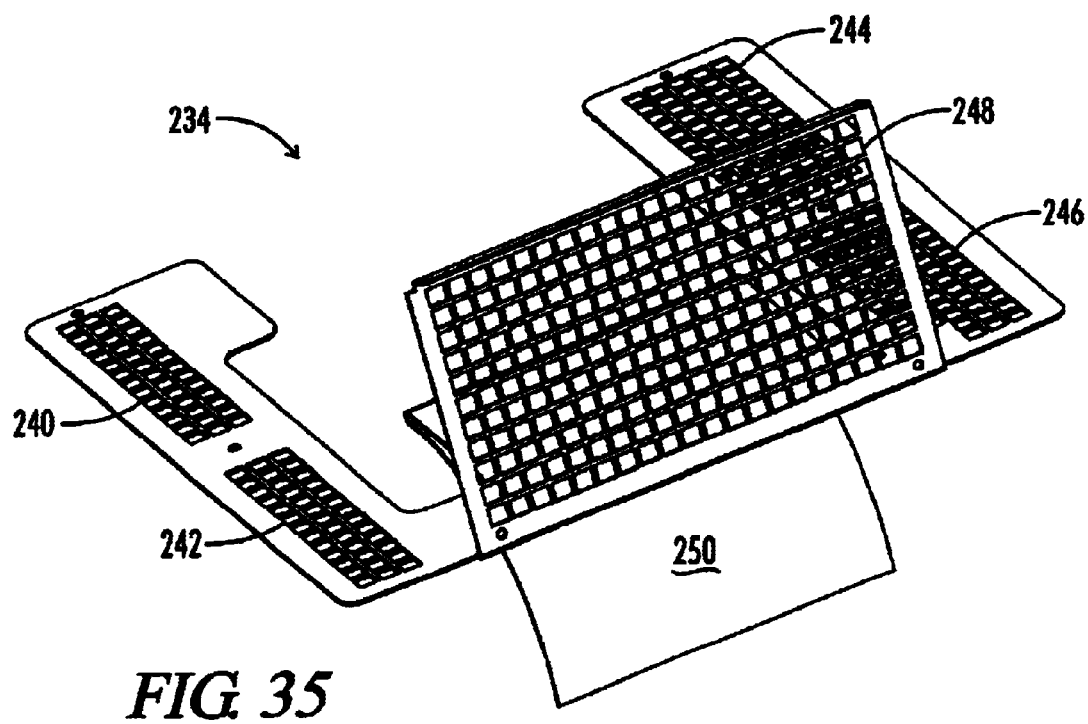
FIG. 35 is an enlarged perspective view of the filter plate shown in FIG. 26.
Figure 36:
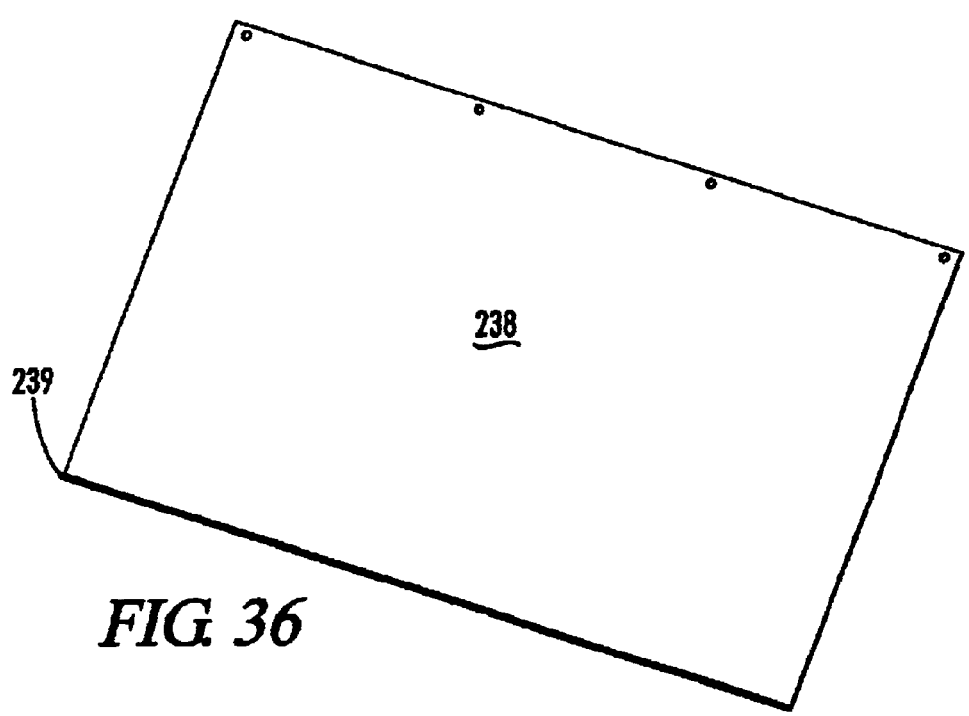
FIG. 36 is an enlarged perspective view of the filter flap shown in FIG. 26.

Enlarged perspective views of the preferred embodiments of the motor clamp 254, the filter plate 234, and the flap 238 are shown in FIGS. 34, 35, and 36, respectively. As shown in FIG. 34, the motor clamp 254 includes a curved clamp portion 302 and two clamp flanges, 304 and 306, which can be used to secure the motor clamp 254 in the fan cavity 232 (see FIG. 33). FIG. 35 shows the filter plate 234 having the four lower filter sections 240, 242, 244, and 246, and the upper filter section 248 as indicated previously. FIG. 36 shows the flap 238 as being a substantially rectangular flat piece of material with a flap tab 239 (see also FIG. 29) extending outward from a lower portion of the flap 238.

Figure 37:
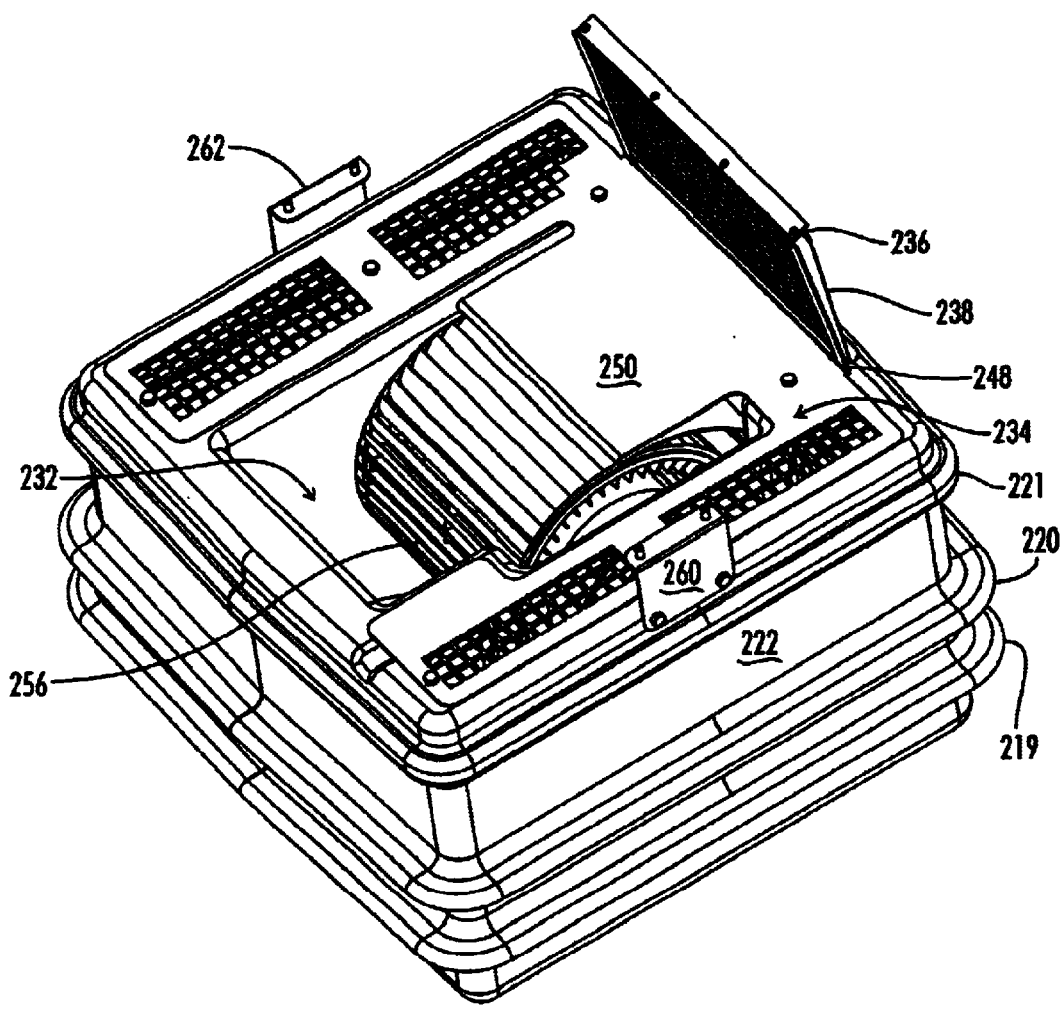
FIG. 37 is an enlarged, partially assembled, perspective view of the embodiment shown in FIG. 26.
Figure 38:
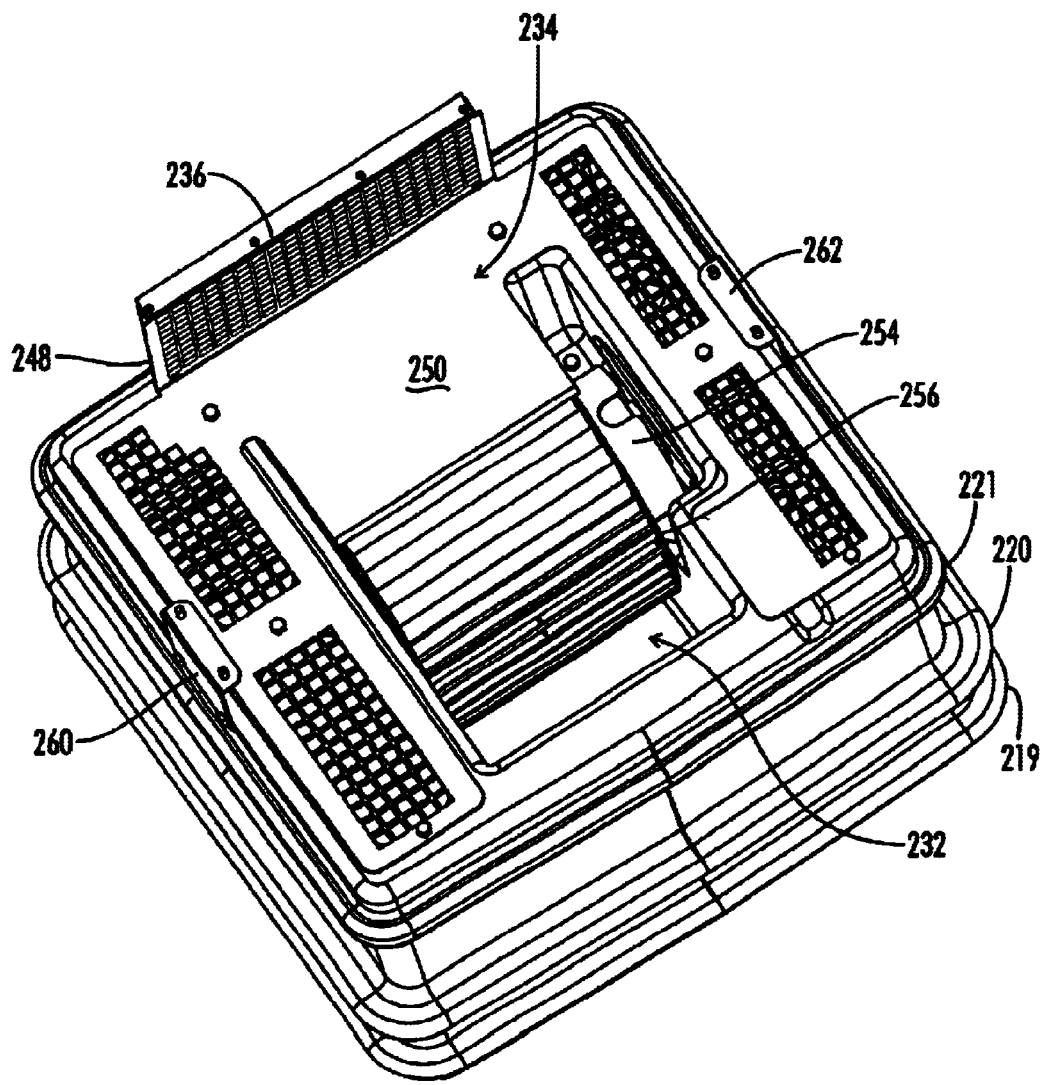
FIG. 38 is a second enlarged, partially assembled, perspective view of the embodiment shown in FIG. 26.
Figure 39:
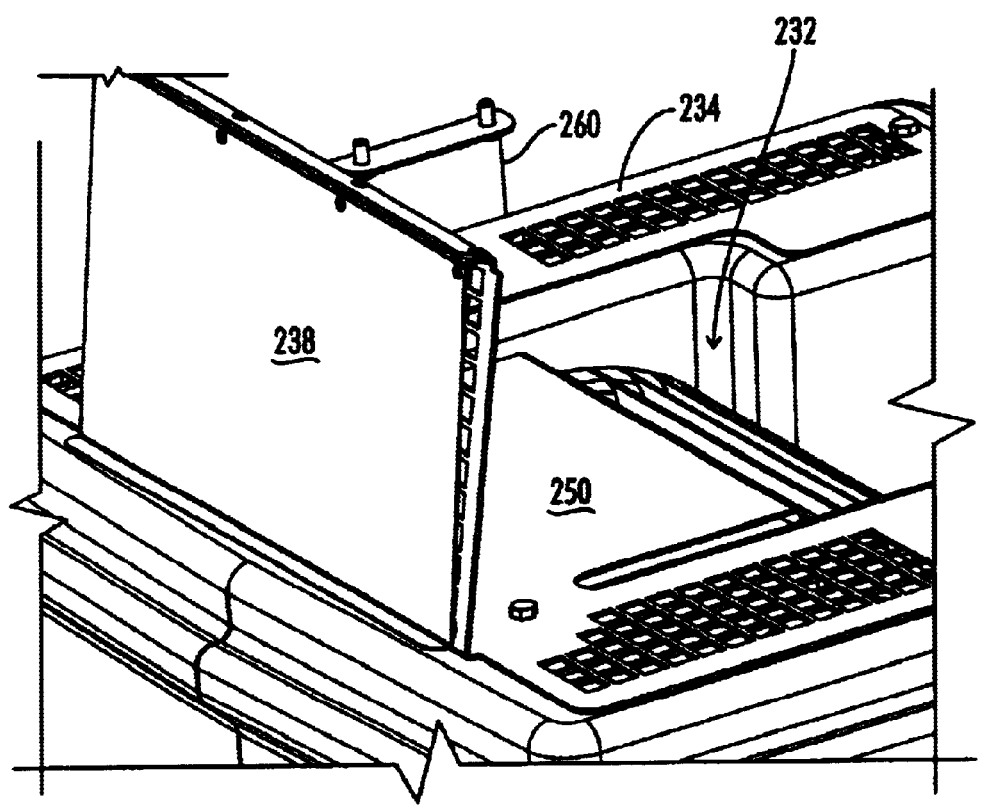
FIG. 39 is an enlarged, partially assembled, perspective view of the embodiment of FIG. 26 showing the filter plate, filter hinge, and filter flap.

FIGS. 37, 38, and 39 are enlarged perspective views of the embodiment 200 without the upper housing 202. FIG. 37 is an enlarged side perspective view showing the lower housing 204, the filter plate 234 connected to the lower housing 204, the housing connectors, 260 and 262, the fan cavity 232, the cylindrical fan 256, the upper filter section 248, the hinge 236, and the flap 238. FIG. 38 is an enlarged rear perspective view that is similar to FIG. 37 with the exception that it also shows the motor clamp 254 connected to the lower housing 204. FIG. 39 is an enlarged perspective view showing the flap 238 connected to the upper filter section 248 using the hinge 236, the housing connector 260, the filter plate 234 connected to the lower housing 204, and the cylindrical fan 256.

Figure 40:
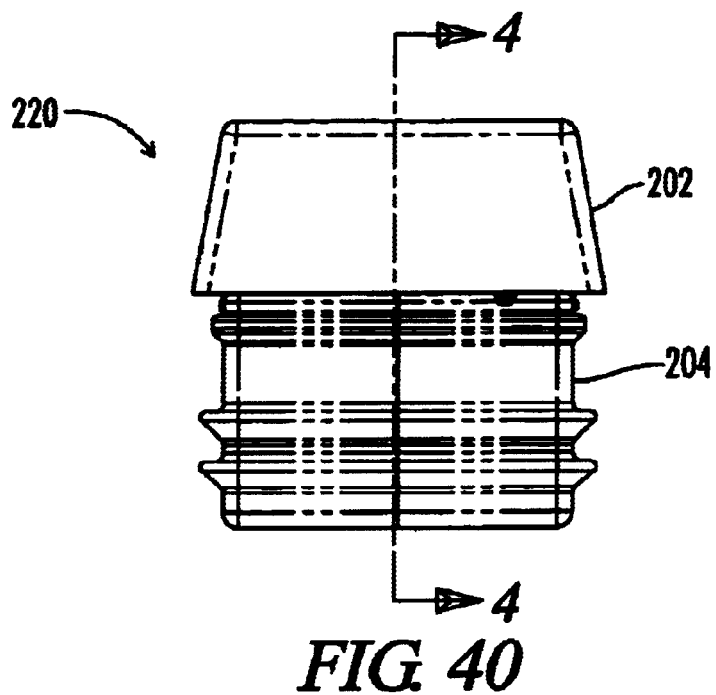
FIG. 40 is a side line drawing view of the embodiment shown in FIG. 27.
Figure 41:
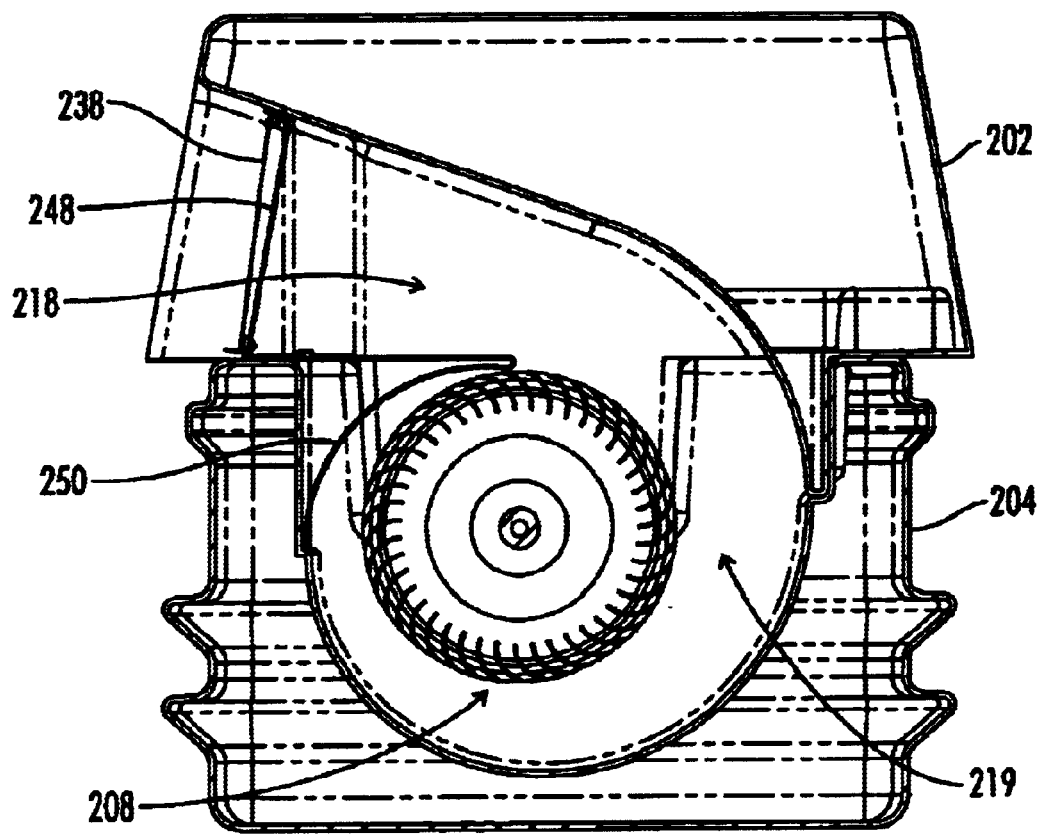
FIG. 41 is a side sectional view taken along the sectional line 4-4 shown in FIG. 40.

FIG. 40 is a side view of the embodiment 200 shown in FIG. 27 and FIG. 41 is a cross sectional view taken along line 4 shown in FIG. 40. FIG. 40 shows the upper housing 202 connected to the lower housing 204. FIG. 41 shows the upper housing 202, the lower housing 204, the upper air channel 218, the flap 238, the upper filter section 248 of the filter plate 234, the lower curved portion 250 of the filter plate 234, the fan assembly 208, and the lower air channel 219.

Figure 42:
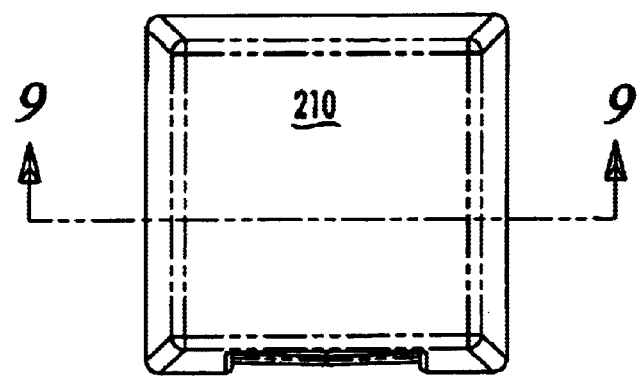
FIG. 42 is a top line drawing view of the embodiment shown in FIG. 27.
Figure 43:
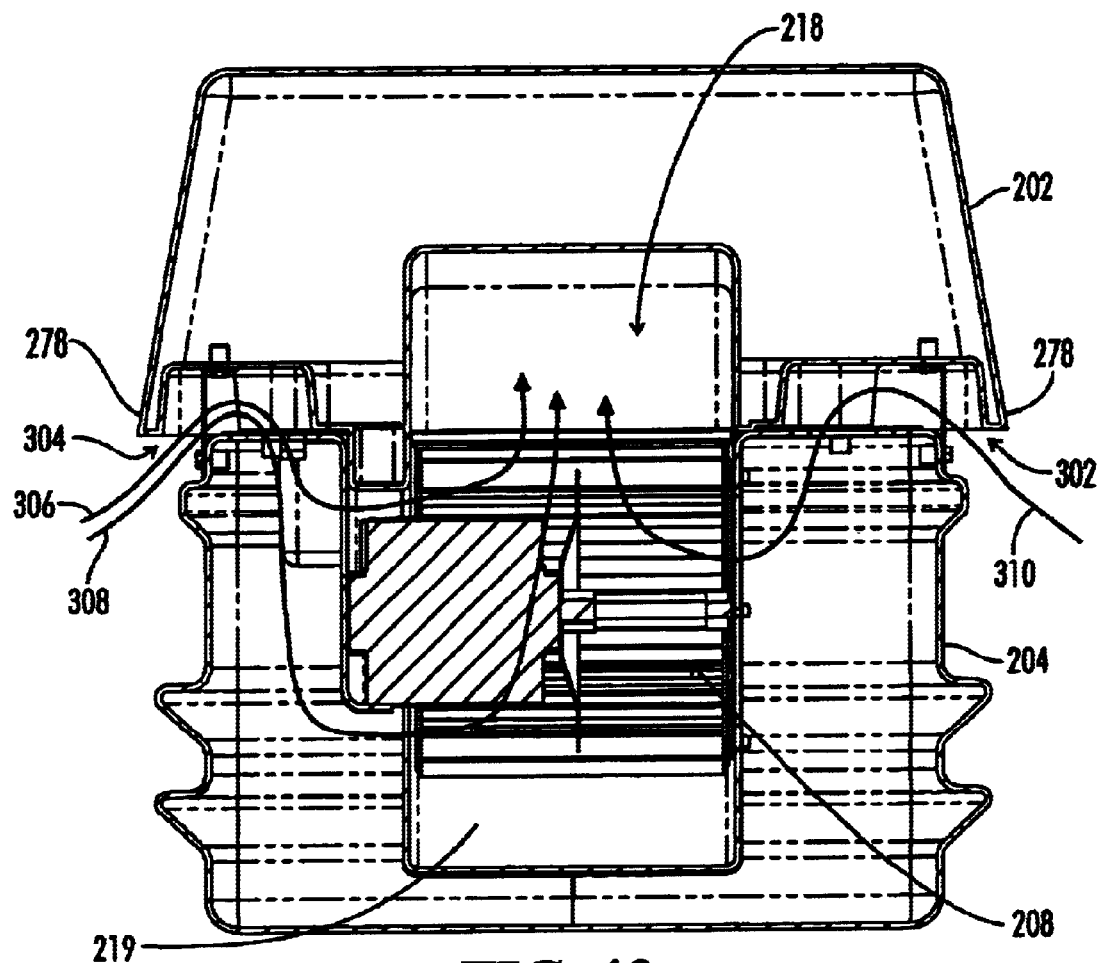
FIG. 43 is a side sectional view taken along the sectional line 9-9 shown in FIG. 42 and showing airflow in the embodiment shown in FIG. 27.

FIG. 42 is a top view of the embodiment 200 shown in FIG. 27 and FIG. 43 is a cross sectional view taken along line 9 shown in FIG. 42. FIG. 42 show the top 210 of the upper housing 202 and FIG. 43 shows the upper housing 202, the lower housing 204, the upper air channel 218, the lower air channel 219, the upper housing lip 278, and the fan assembly 208.

As shown in FIG. 43, the upper and lower housings, 202 and 204, are connected with one another so they form housing openings, 302 and 304 (see also FIGS. 45 and 46), that allow air to flow into the lower housing 204 as shown by arrows, 306, 308, and 310. More specifically, air flows in between the upper housing lip 278 and the lower housing 204, through the lower air filter sections, 240, 242, 244, and 246, of the filter plate 234, through the air inlet openings, 224, 226, 228, and 230, defined in the lower housing 204, and into the lower air channel 219, which is formed by a part of the fan cavity 232. Air then flows from the lower air channel 219 into the upper air channel 218 and out of the upper housing 202. The arrangement of the upper and lower housings, 202 and 204, prevent debris and water from easily passing through the housing openings, 302 and 304. In addition, any debris that does manage to pass through these openings is prevented from passing into the lower housing 204 by the filter plate 234.

Figure 44:
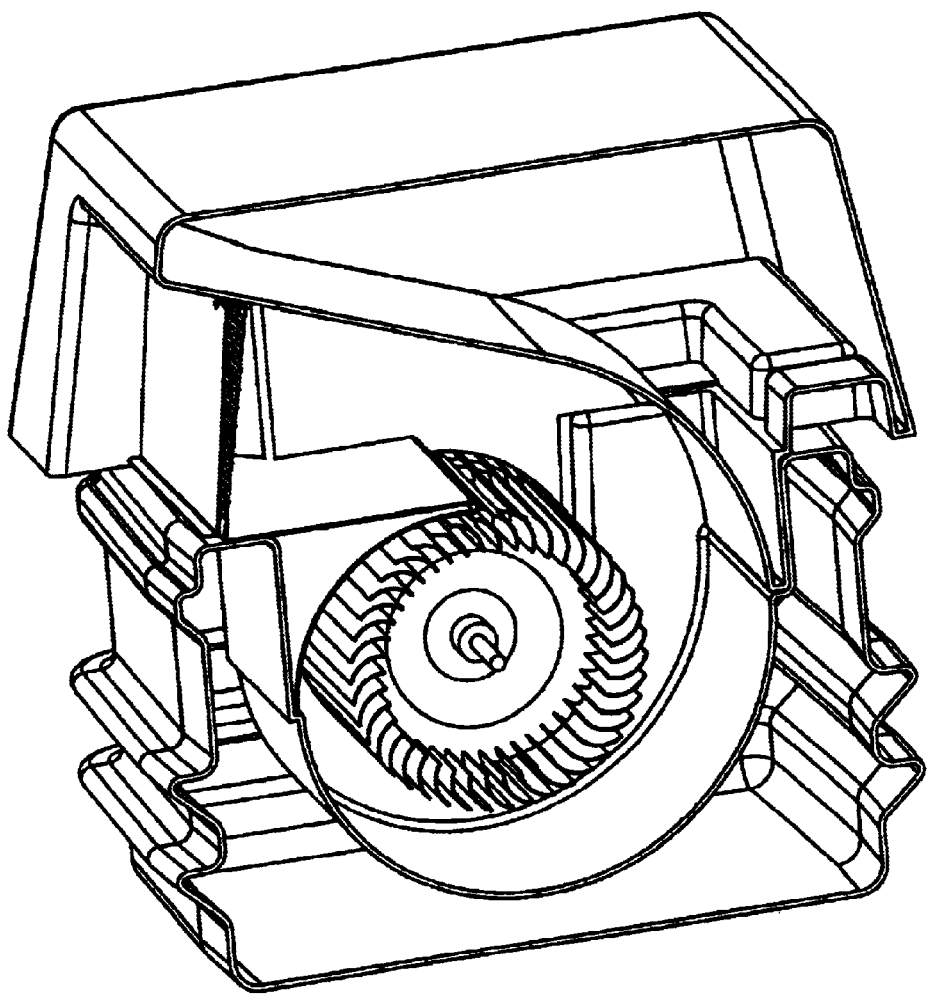
FIG. 44 is a side cut away view of the embodiment shown in FIG. 27.
Figure 45:
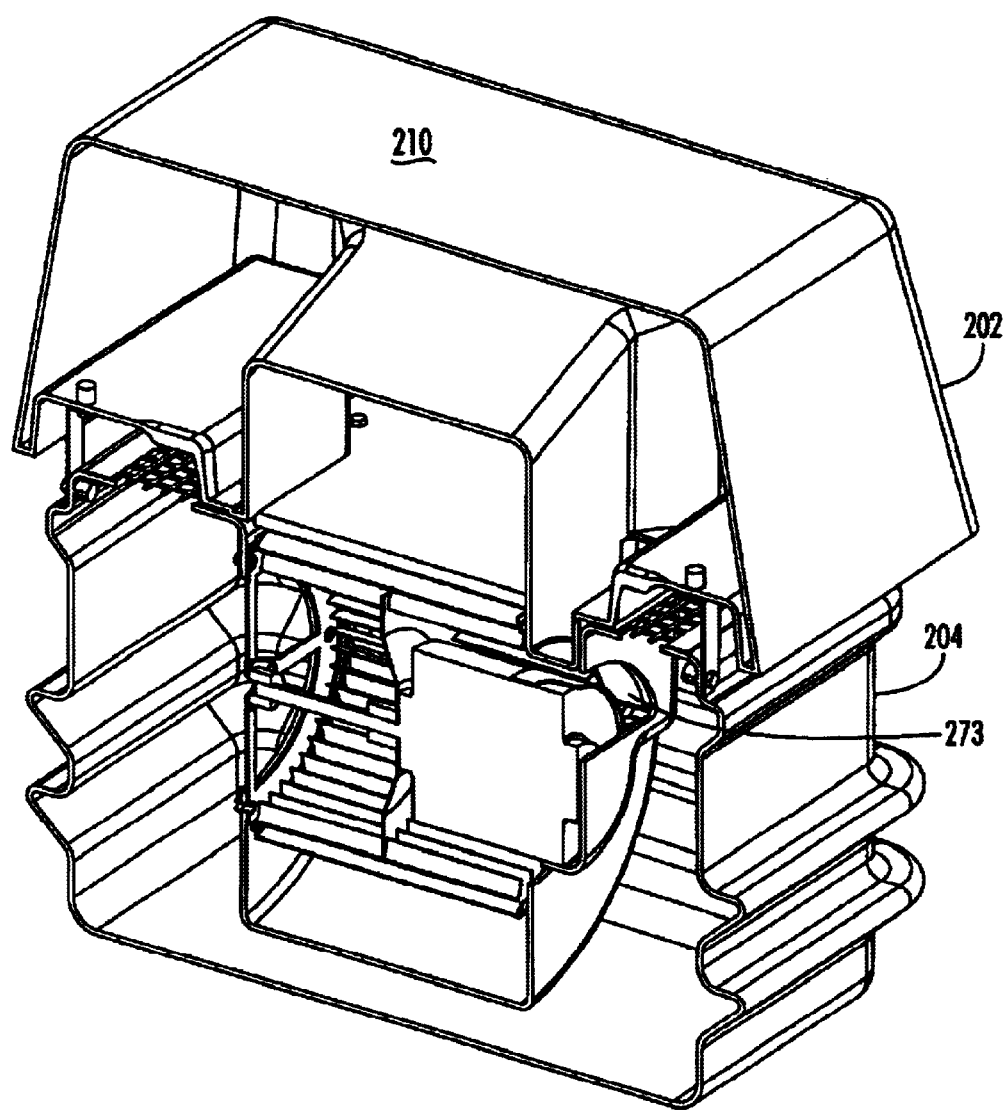
FIG. 45 is a back cut away view of the embodiment shown in FIG. 27.
Figure 46:
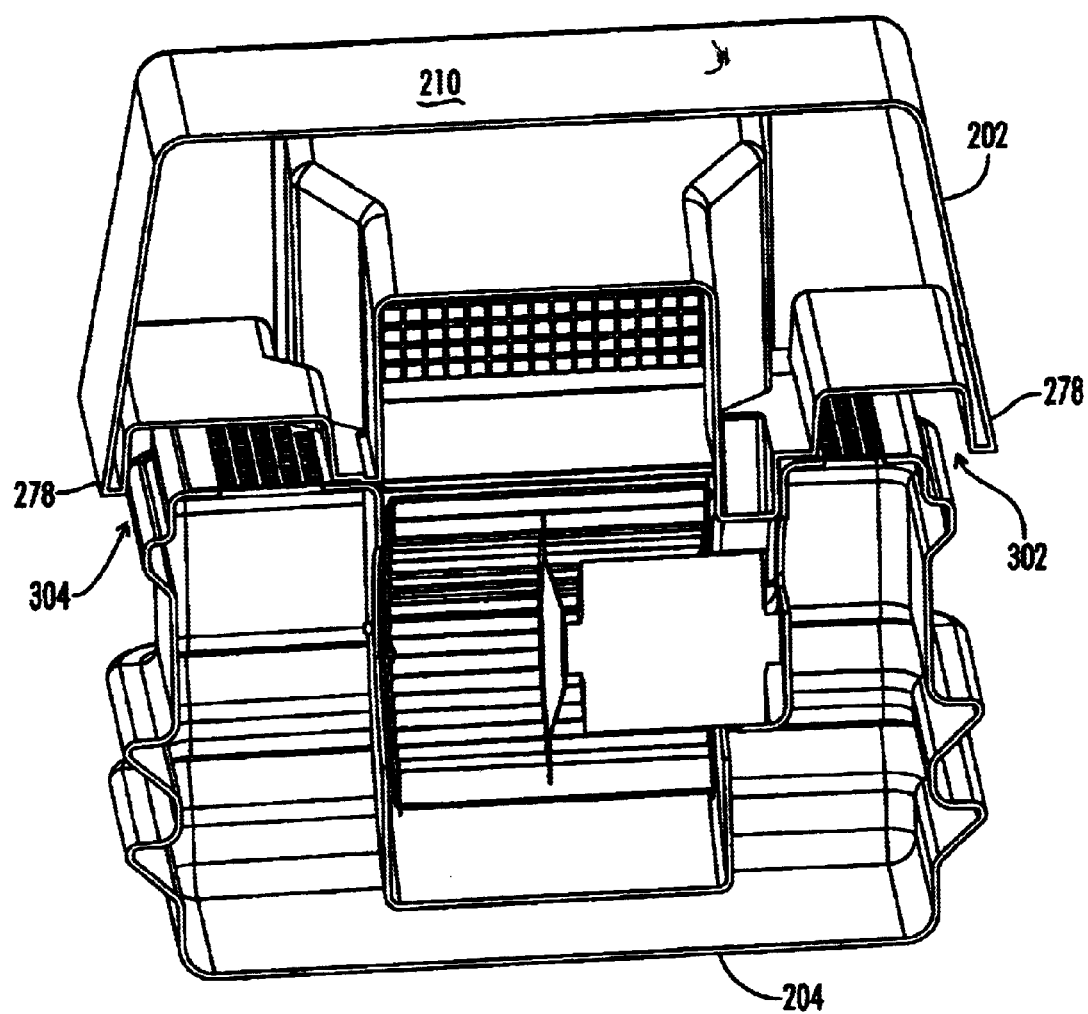
FIG. 46 is a second back cut away view of the embodiment shown in FIG. 27.

FIGS. 44–46 are cut away perspective views of the embodiment 200 shown in FIG. 27 and show the arrangement of the various components included in that embodiment. FIG. 44 is a cut away side perspective view of the embodiment 200, and FIGS. 45 and 46 are cut away rear perspective views of that embodiment. As shown by these figures, the upper and lower housings, 202 and 204, are hollow.

The embodiment 200 shown in FIGS. 26–46 operates in the following manner. First, the upper and lower housings, 202 and 204, are buried in the ground and an appropriate camouflaged lid (not shown) is connected to the upper housing 202. Next, the fan assembly 208 is supplied with power from an external power source (not shown). The fan assembly 208 draws air into the lower housing 204 and forces that air up into and out of the upper housing 202.

As indicated previously with regard to other embodiments of the present invention, a variety of changes may be made to the embodiment 200 shown in FIG. 26. For example, that embodiment may include any one or more of the optional features shown in FIG. 23 and described in more detail previously.

Thus, although there have been described particular embodiments of the present invention of a new and useful Outdoor Fan System, it is not intended that such references be construed as limitations upon the scope of this invention except as set forth in the following claims.

What is claimed is:

1. A outdoor fan system, comprising:
   a lower housing comprising a lower box with an intake surface disposed atop the lower box, the lower housing adapted for installation into a void in the surface of a stratum so that the intake surface is elevated above the stratum surface, the lower housing further comprising at least one intake air channel openning disposed in the intake surface along at least one side of the lower box;
   an upper housing removably attached to the lower housing and adapted to connect to a camouflaging lid, the upper housing comprising an upper box with at least one side overhanging the lower housing along the at least one intake air channel opening so as to form a soffit channel for flowing air from proximate the at least one side of the lower box through the at least one intake air channel opening, the upper housing further comprising a least one exhaust air channel opening disposed in at least one side of the upper box;
   a filter assembly disposed between the upper and lower housings and adapted to filter air flowing into the at least one intake air channel opening and out of the at least one exhaust air channel opening; and
   a fan assembly disposed within the lower housing and adapted to draw air into the at least one intake air channel opening and through the lower housing and to force air through the upper housing and out of the at least one exhaust air channel opening.

2. The system of claim 1, wherein the upper box is square shaped, includes a flat upper surface with rounded edges and corners, and includes at least one sloped side surfaces extending down from the upper surface.

3. The system of claim 1, wherein the upper box is sized so that it is larger in length and width than the lower box and portions of the upper box overhang the lower box so as to form a soffit overhanging substantially all of the intake air channel openings.

4. The system of claim 1, wherein the upper housing includes an upper air channel adapted to channel air flow through the upper housing and out of the at least one exhaust air channel opening.

5. The system of claim 1, wherein the lower box includes a series of ridges and an upper lip extending outward from its sides.

6. The system of claim 1, wherein the lower housing includes a lower air channel adapted to channel air flow into the at least one intake air channel opening and through the lower housing, a fan cavity designed to receive the fan assembly, and at least one wiring channel defined in an upper surface of the lower housing.

7. A outdoor fan system, comprising:
   a lower housing comprising a lower box with an intake surface disposed atop the lower box, the lower housing adapted for installation into a void in the surface of a stratum so that the intake surface is elevated above the stratum surface, the lower housing further comprising least one intake air channel opening disposed in the intake surface along at least one side of the lower box;
   an upper housing removably attached to the lower housing and adapted to connect to a camouflaging lid, the upper housing comprising an upper box with at least one side overhanging the lower housing along the at least one intake air channel opening so as to form a soffit channel for flowing air from proximate the at least one side of the lower box through the at least one intake air channel opening, the upper housing further comprising a least one exhaust air channel opening disposed in at least one side of the upper box;

a filter assembly between the upper and lower housings and adapted to filter air flowing into the at least one intake air channel opening and out of the at least one exhaust air channel opening, the filter assembly including filter plate; and a fan assembly dispose within the lower housing and adapted to draw air into the at least one intake air channel opening and through the lower housing and to force air through the upper housing and out of the at least one exhaust air channel opening, the fan assembly including a motor having a motor shaft, a motor clamp connected to the lower housing and designed to secure the motor to the lower housing, a cylindrical fan connected to the motor shaft and designed to draw air into the lower housing and to force air out of the lower housing, and a motor support connected inside the lower housing and rotatably connected to the motor shaft, the motor support designed to provide support for the motor shaft.

8. The fan system of claim 7, further comprising at least one housing connector for connecting the upper and lower housings together, the housing connector including at least one connector pin.

9. The fan system of claim 7, wherein the upper housing includes:

an indented lower surface forming an upper housing lip;

an upper motor support extending outward from the indented lower surface;

an upper housing curved portion defined in the upper housing and including a triangular portion extending outward from the indented lower surface, the upper housing curved portion designed to channel air through the upper housing; and upper housing side walls forming the upper housing curved portion.

10. The fan system of claim 9, wherein the upper motor support is designed to form a motor cavity air inlet around the motor when the upper and lower housings are connected together.

11. The fan system of claim 9, wherein the indented lower surface includes at least one upper housing connector opening for receiving a connector pin and holding the upper housing in place with respect to the lower housing.

12. The fan system of claim 7, wherein the lower housing includes:

a lower housing curved portion designed to channel air through the lower housing;

first and second lower housing side walls forming the lower housing curved portion;

a lower housing lip designed to provide support for the filter plate and formed in the intake surface;

a motor support opening defined in the first lower housing side wall and designed to receive the motor support; and a lower housing motor support defined in the second lower housing side wall and designed to provide support for the motor and the motor clamp.

13. The fan system of claim 7, wherein the motor clamp includes:

a curved clamp portion designed to partially encircle the motor; and at least one clamp flange designed to be used to secure the motor inside the lower housing.

14. The fan system of claim 7, wherein the upper and lower housings are connected together so that they form soffit openings in the soffit channel that allow air to flow between the upper and lower housings and into the lower housing.

* * * * *